(12) United States Patent
Scheidt et al.

(10) Patent No.: US 7,178,025 B2
(45) Date of Patent: Feb. 13, 2007

(54) ACCESS SYSTEM UTILIZING MULTIPLE FACTOR IDENTIFICATION AND AUTHENTICATION

(75) Inventors: Edward M. Scheidt, McLean, VA (US); Ersin Domanque, Woodbine, MD (US); Roger Butler, Centreville, VA (US); Wai Tsang, Falls Church, VA (US)

(73) Assignee: Tec Sec, Inc., Vienna, VA (US)

( * ) Notice: Subject to any disclaimer, the term of this patent is extended or adjusted under 35 U.S.C. 154(b) by 0 days.

(21) Appl. No.: 10/502,478

(22) PCT Filed: Jan. 30, 2003

(86) PCT No.: PCT/US03/02931

§ 371 (c)(1),
(2), (4) Date: May 23, 2005

(87) PCT Pub. No.: WO03/065169

PCT Pub. Date: Aug. 7, 2003

(65) Prior Publication Data

US 2005/0235148 A1     Oct. 20, 2005

Related U.S. Application Data

(63) Continuation-in-part of application No. 10/060,039, filed on Jan. 30, 2002, now Pat. No. 6,845,453, which is a continuation-in-part of application No. 10/060,011, filed on Jan. 30, 2002, now Pat. No. 6,754,820.

(51) Int. Cl.
*G06F 17/60* (2006.01)
*H04L 9/00* (2006.01)

(52) U.S. Cl. ............... 713/168; 713/166; 713/176; 713/182; 713/183; 713/184; 713/185; 713/186; 705/67; 726/2; 726/5; 726/8; 726/9; 726/10

(58) Field of Classification Search ............. 713/166, 713/168, 176, 182–185, 186; 705/67; 726/2, 726/5, 8–10
See application file for complete search history.

(56) References Cited

U.S. PATENT DOCUMENTS 5,280,527 A * 1/1994 Gullman et al. ............ 713/184

(Continued)

OTHER PUBLICATIONS

Vipin Samar, Unified Login with Pluggable authentication modules (PAM), Proceedings of the ACM conference on Computer and communications society, ACM Press, Jan. 1996.*

(Continued)

*Primary Examiner*—Taghi T. Arani
(74) *Attorney, Agent, or Firm*—IP Strategies

(57) ABSTRACT

A method of authenticating a user to use a system includes using a provider token to generate a random value. The token generates a derived key based at least in part on a token-provided salt value and a user-provided password. The provider generates a token unlock key based at least in part on the derived key and sends it to the token. First and second challenge data instances are generated by the provider and the token, respectively, and the process is terminated if the challenge data instances are determined not to match. If the challenge data instances are determined to match, then an encrypted data transfer system is established between the token and the provider, and the token unlocks locked private data stored on the token. The user is authenticated for secured use of the system based at least in part on the unlocked private data.

22 Claims, 23 Drawing Sheets

U.S. PATENT DOCUMENTS

| | | | |
|---|---|---|---|
| 5,495,533 A | 2/1996 | Linehan et al. | |
| 5,499,297 A | 3/1996 | Boebert | |
| 5,694,472 A | 12/1997 | Johnson et al. | |
| 5,805,719 A | 9/1998 | Pare, Jr. et al. | |
| 5,907,597 A | 5/1999 | Mark | |
| 6,011,847 A | 1/2000 | Follendore, III | |
| 6,035,398 A | 3/2000 | Bjorn | |
| 6,035,406 A | 3/2000 | Moussa et al. | |
| 6,041,410 A * | 3/2000 | Hsu et al. | 713/186 |
| 6,219,790 B1 | 4/2001 | Lloyd et al. | |
| 6,263,446 B1 * | 7/2001 | Kausik et al. | 726/5 |
| 6,307,955 B1 | 10/2001 | Zank et al. | |
| 6,317,834 B1 * | 11/2001 | Gennaro et al. | 713/186 |
| 6,332,193 B1 | 12/2001 | Glass et al. | |
| 6,385,318 B1 | 5/2002 | Oishi | |
| 6,401,206 B1 * | 6/2002 | Khan et al. | 713/176 |
| 6,490,680 B1 * | 12/2002 | Scheidt et al. | 713/166 |
| 6,532,542 B1 | 3/2003 | Thomlinson et al. | |
| 6,553,494 B1 | 4/2003 | Glass | |
| 6,615,350 B1 * | 9/2003 | Schell et al. | 713/168 |
| 6,845,453 B2 * | 1/2005 | Scheidt et al. | 726/5 |

OTHER PUBLICATIONS

Dalton, Strongly Auth. and Encrypted Multi-level Access to CMW Sys. over Insecure Networks using the SSH Protocol, HP Labs Bristol, Feb. 1999, pp. 1-17, HPL-98-99(R.1).

Smith, Multi-Level Security, http://www.smat.us/crypto/mis/, Aug. 9, 2002, pp. 1-2.

* cited by examiner

| NUMBER | DECRYPT | ENCRYPT | NUMBER | DECRYPT | ENCRYPT | NUMBER | DECRYPT | ENCRYPT |
|---|---|---|---|---|---|---|---|---|
| 1 | - | - | 4 | ← | - | 7 | → | - |
| 2 | - | ← | 5 | ← | ← | 8 | → | ← |
| 3 | - | → | 6 | ← | → | 9 | → | → |

FIG. 7

| ACCESS TYPE | SET OF AVAILABLE CREDENTIALS |
|---|---|
| 1 | $\{(c \in P \ni \exists x_c \in c \land \lambda_c = \lambda_{IA}) \cap (c \in P \ni \exists y_c \in c \land \lambda_c = \lambda_{IA})\}$ |
| 2 | $\{(c \in P \ni \exists x_c \in c \land \lambda_c = \lambda_{IA}) \cap (c \in P \ni \exists y_c \in c \land \lambda_c \geq \lambda_{IA})\}$ |
| 3 | $\{(c \in P \ni \exists x_c \in c \land \lambda_c = \lambda_{IA}) \cap (c \in P \ni \exists y_c \in c \land \lambda_c \leq \lambda_{IA})\}$ |
| 4 | $\{(c \in P \ni \exists x_c \in c \land \lambda_c \geq \lambda_{IA}) \cap (c \in P \ni \exists y_c \in c \land \lambda_c = \lambda_{IA})\}$ |
| 5 | $\{(c \in P \ni \exists x_c \in c \land \lambda_c \geq \lambda_{IA}) \cap (c \in P \ni \exists y_c \in c \land \lambda_c \geq \lambda_{IA})\}$ |
| 6 | $\{(c \in P \ni \exists x_c \in c \land \lambda_c \geq \lambda_{IA}) \cap (c \in P \ni \exists y_c \in c \land \lambda_c \leq \lambda_{IA})\}$ |
| 7 | $\{(c \in P \ni \exists x_c \in c \land \lambda_c \leq \lambda_{IA}) \cap (c \in P \ni \exists y_c \in c \land \lambda_c = \lambda_{IA})\}$ |
| 8 | $\{(c \in P \ni \exists x_c \in c \land \lambda_c \leq \lambda_{IA}) \cap (c \in P \ni \exists y_c \in c \land \lambda_c \geq \lambda_{IA})\}$ |
| 9 | $\{(c \in P \ni \exists x_c \in c \land \lambda_c \leq \lambda_{IA}) \cap (c \in P \ni \exists y_c \in c \land \lambda_c \leq \lambda_{IA})\}$ |

FIG. 11

| ACCESS TYPE | $xek_c$ | $yek_c$ | INDEPENDENT READ VALUE | INDEPENDENT WRITE VALUE |
|---|---|---|---|---|
| 1 | $xek_c = \kappa_\lambda$ | $yek_c = \kappa_\lambda$ | N/A | N/A |
| 2 | $xek_c = \kappa_\lambda$ | $yek_c = (H^{(\lambda c - 1)}(yek_1)) / 2^{(h-k)}$ | N/A | $yek_1$ |
| 3 | $xek_c = \kappa_\lambda$ | $yek_c = (H^{(s - \lambda c)}(xek_s)) / 2^{(h-k)}$ | N/A | $yek_s$ |
| 4 | $xek_c = (H^{(\lambda c - 1)}(xek_1)) / 2^{(h-k)}$ | $yek_c = \kappa_\lambda$ | $xek_1$ | N/A |
| 5 | $xek_c = (H^{(\lambda c - 1)}(xek_1)) / 2^{(h-k)}$ | $yek_c = (H^{(\lambda c - 1)}(yek_1)) / 2^{(h-k)}$ | $xek_1$ | $yek_1$ |
| 6 | $xek_c = (H^{(\lambda c - 1)}(xek_1)) / 2^{(h-k)}$ | $yek_c = (H^{(s - \lambda c)}(xek_s)) / 2^{(h-k)}$ | $xek_1$ | $yek_s$ |
| 7 | $xek_c = (H^{(s - \lambda c)}(xek_s)) / 2^{(h-k)}$ | $yek_c = \kappa_\lambda$ | $xek_s$ | N/A |
| 8 | $xek_c = (H^{(s - \lambda c)}(xek_s)) / 2^{(h-k)}$ | $Yek_c = (H^{(\lambda c - 1)}(yek_1)) / 2^{(h-k)}$ | $xek_s$ | $yek_1$ |
| 9 | $xek_c = (H^{(s - \lambda c)}(xek_s)) / 2^{(h-k)}$ | $xek_c = (H^{(s - \lambda c)}(xek_s)) / 2^{(h-k)}$ | $xek_s$ | $yek_s$ |

FIG. 12

PROFILE ENCRYPTION

ENCRYPTED PROFILE ENCRYPTION KEYS

$ePEK_1 = e(PEK, \kappa_1)$
$ePEK_2 = e(PEK, \kappa_2)$
$\vdots$
$ePEK_{\lambda max} = e(PEK, \kappa_{\lambda max})$

ENCRYPTED CREDENTIAL PRIVATE AND PUBLIC KEY ENCRYPTION KEYS

$exek_1 = e(xek_1, \kappa_1) \quad eyek_1 = e(yek_1, \kappa_1)$
$exek_2 = e(xek_2, \kappa_2) \quad eyek_2 = e(yek_2, \kappa_2)$
$\vdots$
$exek_{\lambda max} = e(xek_{\lambda max}, \kappa_{\lambda max}) \quad eyek_{\lambda max} = e(yek_{\lambda max}, \kappa_{\lambda max})$

ENCRYPTED PROFILE

$eProfile = e(Profile, PEK)$

ENCRYPTED CREDENTIAL PRIVATE AND PUBLIC KEYS

$ex_1 = e(x_1, xek_{\lambda(1)}) \quad ey_1 = e(y_1, yek_{\lambda(1)})$
$ex_2 = e(x_2, xek_{\lambda(2)}) \quad ey_2 = e(y_2, yek_{\lambda(2)})$
$\vdots$
$ex_n = e(x_n, xek_{\lambda(n)}) \quad ey_n = e(y_n, yek_{\lambda(n)})$

FIG. 13

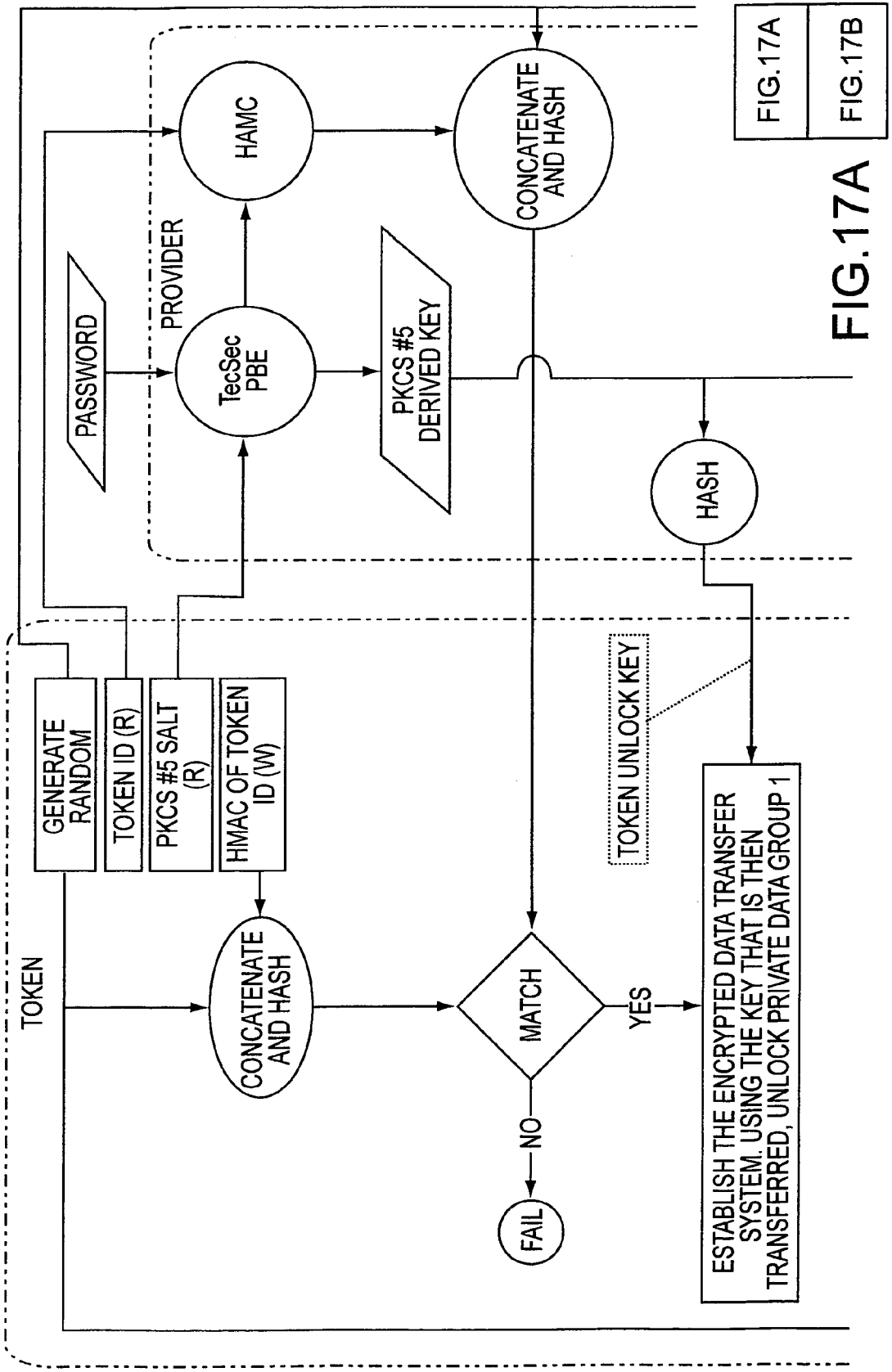

ACCESS SYSTEM UTILIZING MULTIPLE FACTOR IDENTIFICATION AND AUTHENTICATION

CROSS-REFERENCE TO RELATED APPLICATIONS

This is a continuation-in-part of co-pending U.S. patent application Ser. No. 10/060,039, which was filed on Jan. 30, 2002 now U.S. Pat. No. 6,845,453. This is also a continuation-in-part of co-pending U.S. patent application Ser. No. 10/060,011, which was filed on Jan. 30, 2002 now U.S. Pat. No. 6,754,820.

FIELD OF THE INVENTION

Generally, the present invention relates to techniques for controlling access to computer-based systems, and to techniques for providing user identification, apparatus that enable user identification techniques, and systems that implement and utilize user identification techniques. In particular, the present invention relates to techniques for providing multiple-level access control to objects in a computer system.

BACKGROUND OF THE INVENTION

One of the largest problems in cryptography is the binding of particular data to an individual. This involves two steps. First the individual can be bound to some unique identifier (for example, typically, a key,). Next, the particular data can be signed or encrypted using the unique identifier (or key material). To accomplish the binding, the individual can be authenticated to the container or system that holds the cryptographic information. For any identity assurance model to have heightened effectiveness, it should include all the necessary parts for identification, authentication, and access control.

Access control can be defined as enforcing data-use or other object-use permissions that grant or deny access to content or applications. In this context, data-use can include a broad selection of functions such as reading, changing, executing, creating, overwriting, or deleting. The ability to change access permissions is another type of access that can be granted or denied.

Access control should be considered in a system approach in which a strong user (entity or member) identification and authorization (I&A) process plays a role.

Thus, the goal is to provide access control to objects such as data and applications. It should be flexible and suitable for implementing a variety of different schemes, such as discretionary access controls (DAC) and mandatory access controls (MAC). The key management system should be suitable for implementing a role-based access control system (RBAC). These controls should support content-based access control architectures that provide a very granular object level enforcement or that enable an expanded access.

Likewise, there are many systems that require user access. Some have many users and require authorized users to log in. Some require user identification to access a particular portion or aspect of the system. Some contain personal information. There are many reasons to restrict access to these systems to authorized users. Authorized users have to be identified before access can be granted.

For example, computer systems and subsystems are well known in the art. For security and privacy purposes, some computer systems include user identification protocols to limit access to authorized or validated users. For example, protocols are often put in place to limit access to the system, to a particular subsystem or other portion of the system, to particular databases, or to certain applications, documents and portions of documents, objects, and workstations. As used herein, the term "system" will be used to mean any of these entities. Such validation protocols are useful to the extent that they can provide reliable identification of an authorized user, and do not mis-identify an unauthorized user.

A conventional user identification protocol requires users to submit knowledge-based data, such as a password and user ID, in order to gain access to a computer system. A submitted user ID may be used to reference a password associated with the user ID, with the passwords being compared to determine whether a particular user is authorized to access the system. A benefit of knowledge-based identification protocols is that access to requisite knowledge-based data can be totally unavailable to unauthorized entities, which increases the overall strength of the protocol. For example, a user is not required to record knowledge-based data anywhere other than in the user's memory, that is, in the user's brain.

However, most knowledge-based identification protocols suffer from an inherent problem. To prevent the hacking or spoofing of the knowledge-based data, the complexity of the data can be increased. For example, longer or more complicated passwords can be specified to make guessing of the password less likely. However, knowledge-based data that is too complex might result in an unacceptably high rate of false negatives (for example, forgotten and/or mistyped data) or in weakened password practice (for example, users might perceive the need to record such data in insecure ways, such as on paper, because the data is too difficult to memorize). Similarly, to avoid such problems, the complexities of the knowledge-based data can be decreased. However, such a decrease in complexity can increase the protocol's susceptibility to hacking or spoofing.

Another conventional user identification protocol requires users to submit possession-based data, such as an authorization code stored on an access pass (for example, a magnetic-stripe card or a smart card), and the submitted code is evaluated to determine user access. A benefit of possession-based identification protocols is that the requisite possession-based data can be extraordinarily complicated, in order to minimize the likelihood that such data is hacked or spoofed. Another benefit is that possession-based data does not require memorization of the data by a user, so that complexity limitations can be avoided.

However, possession-based identification protocols suffer from a potential weakness. Possession-based data (that is, the data stored on the token or other storage medium) can be stolen or lost. Thus, someone who steals or otherwise obtains a user's access pass can spoof the protocol by mere possession of the access pass. Likewise, if the access pass is lost, a "false negative" is assured until it is replaced.

Another conventional user identification protocol requires users to submit biometric-based data, such as a fingerprint scan, for example, and this biometric data is evaluated to determine user access. Such an identification protocol generally includes two stages: enrollment and identification. During enrollment, a biometric instance (such as a fingerprint scan) is obtained, and unique characteristics or features of the biometric instance are extracted to form a biometric template, which is stored as an enrollment template for subsequent identification purposes. Identification involves obtaining a subsequent biometric instance reading of the same type, extracting unique characteristics or features of the subsequent biometric instance to form a new template (the verification template), and comparing the two biometric templates to determine identification of the user. A benefit of biometric-based identification protocols is that the requisite biometric-based data is unique, which minimizes the likelihood of such data being hacked or spoofed. Another benefit is that biometric-based data also does not require memorization of the data by a user.

However, some biometric-based identification protocols suffer from potential weaknesses. Biometric-based data samples of a particular user can be inconsistent from one sampling to another, and therefore these protocols can be subject to false negatives. To improve the reliability of biometric samplings, a larger biometric measurement may be sampled, in order to reduce the likelihood of false negatives. For example, a commercial solution known as Bioscript™ (Bioscript, Inc., Mississauga, Ontario, Canada) utilizes such a methodology to account for distortions, such as cuts, scratches and other day-to-day variations of a user's fingerprint. However, increasing the size or scope of a biometric sample also increases the costs (such as electrical power, time, processing power, design and other implementation costs, training) incurred in utilizing a larger sample.

Therefore, it would be desirable to provide a method of identifying a user for access to a system that improves on conventional methods. It would also be desirable to provide an apparatus for enabling improved user identification techniques. It would also be desirable to provide a system to implement and utilize an improved method of identifying a user for access to a system. It would also be desirable to provide a computer-readable medium that stores instructions for controlling a computer to perform an improved method of identifying a user for access to a system.

BRIEF SUMMARY OF THE INVENTION

It is therefore an objective of the present invention to enforce domain member access control to labeled data with cryptography, that is, by using symmetric key algorithms, asymmetric key algorithms, and cryptographic hash functions.

It is another objective of the present invention to enforce domain member access control to applications.

It is an additional objective of the present invention to control encryption (write) and decryption (read) of objects based on the content of the object.

It is also an objective of the present invention to allow credential application to restrict or broaden readership of labeled objects.

It is another objective of the present invention to provide a user interface paradigm that is intuitive and easy to use.

It is an additional objective of the present invention to provide sensitivity level or multiple-level access control such that access to credentials is dependant on the method of member identification.

It is also an objective of the present invention to enforce domain authority-dictated policies for multiple-level access control by credential category.

The present invention provides a method of validating a user for access to a system based on a number of user-provided factors. These factors can include, for example, any combination of what the user knows (that is, knowledge-based data); who the user is (that is, biometric-based data); what the user possesses (that is, token-based data; where the user is (that is, location-based data); and when the user is seeking validation (that is, time-based data). One or more additional factors can be substituted for or added to this list. A validated key is created by binding the factors together to provide authorization data. A validated key can be used directly, for example, as an access code, or indirectly, for example, to decrypt or allow access to an access code, or as keying data in a key management scheme, to access the system.

The present invention also provides an apparatus that validates a user for access to a system based on a number of user-provided factors. These factors can include, for example, any combination of what the user knows (that is, knowledge-based data); who the user is (that is, biometric-based data); what the user possesses (that is, token-based data; where the user is (that is, location-based data); and when the user is seeking validation (that is, time-based data). One or more additional factors can be substituted for or added to this list. A validated key is created by binding the factors together to provide authorization data. A validated key can be used directly, for example, as an access code, or indirectly, for example, to decrypt or allow access to an access code, or as keying data in a key management scheme, to access the system.

The present invention also provides a computer-readable medium that stores instructions that can cause a computer to validate a user for access to a system based on a number of user-provided factors. These factors can include, for example, any combination of what the user knows (that is, knowledge-based data); who the user is (that is, biometric-based data); what the user possesses (that is, token-based data; where the user is (that is, location-based data); and when the user is seeking validation (that is, time-based data). One or more additional factors can be substituted for or added to this list. A validated key is created by binding the factors together to provide authorization data. A validated key can be used directly, for example, as an access code, or indirectly, for example, to decrypt or allow access to an access code, or as keying data in a key management scheme, to access the system.

The present invention can further include at least one factor-reliability check, in which the factors provided by the user include plaintext data and encrypted data corresponding to the plaintext data. The encrypted data and the plaintext data are interrogated against each other to assess correspondence. Correspondence between the encrypted data and the plaintext data results in user validation, whereas a lack of correspondence does not result in user validation.

The factors can include possession-based data provided via a token, such that at least one aspect of the invention can be performed on or resides on the token, so that hacking or spoofing of the system of the invention is hindered.

An exemplary multiple-factor identification system is shown in FIG. 15.

According to an aspect of the present invention, a method of authenticating the identity of a user to determine access to a system includes providing a number of factor-based data instances corresponding to a user, evaluating the factor-based data instances to determine if the user's identity is authenticated, restricting the user's access to the system if the user's identity is not authenticated, and granting the user's access to the system if the user's identity is authenticated. An authentication value can be provided, based on the evaluation determination. Restricting the user's access can include denying the user's access. The factor-based data instances can include any combination of the following: a knowledge-based data instance, a possession-based data instance, and a biometric-based data instance.

According to another aspect of the present invention, a method of authenticating the identity of a user to determine access to a system includes providing a number of factor-based data instances corresponding to a user, including at least one modified data instance based on a second data instance of the plurality of factor-based data instances. A key is generated based on a first data instance of the plurality of factor-based data instances, and applied to the at least one modified data instance to generate a recovered data instance. The recovered data instance is interrogated against the second data instance to generate an authentication value as a result of a correspondence evaluation. The user's access to the system is restricted based at least in part on an invalid authentication value, and granted based at least in part on a valid authentication value. The authentication value can be a first authentication value, in which case the first authentication value is combined with at least one other authentication value, to generate a combined authentication value. Restricting the user's access can include denying the user's access. The factor-based data instances can include any combination of the following: a knowledge-based data instance, a possession-based data instance, and a biometric-based data instance.

According to another aspect of the present invention, a method of authenticating the identity of a user to determine access to a system includes providing a possession-based data instance, a modified version of the possession-based data instance, a knowledge-based data instance, a biometric-based data instance, and a modified version of the biometric-based data instance. A key is generated based on the knowledge-based data instance, and applied to the modified version of the possession-based data instance to generate a first recovered data instance. The first recovered data instance is interrogated against the possession-based data instance to generate a possession value as a result of a first correspondence evaluation. The key is also applied to the modified version of the biometric-based data instance to generate a second recovered data instance. The second recovered data instance is interrogated against the biometric-based data instance to generate a biometric value as a result of a second correspondence evaluation. The key, the possession value, and the biometric value are combined to form an authentication value. The user's access to the system is restricted if the user's identity is not authenticated, based at least in part on the authentication value, and the user's access to the system is granted if the user's identity is authenticated, based at least in part on the authentication value. Restricting the user's access can include denying the user's access. The modified version of the biometric-based data instance can be a first modified version of the biometric-based data instance, in which case the biometric value is a second modified version of the biometric-based data instance. For example, the biometric value can be a cryptographic hash of the biometric-based data instance. Restricting the user's access to the system and granting the user's access to the system can be based on a modified version of the authentication value, for example, a cryptographic hash of the authentication value.

According to another aspect of the present invention, a method of authenticating the identity of a user to determine access to a system includes providing a possession-based data instance, a stored biometric-based data instance, and a read biometric-based data instance. The stored biometric-based data instance is interrogated against the read biometric-based data instance to generate a biometric value as a result of a correspondence evaluation, and the possession-based data instance and the biometric value are combined to form an authentication value, which is evaluated the authentication value to determine if the user's identity is authenticated. The user's access to the system is restricted if the user's identity is not authenticated, based at least in part on the authentication value, and the user's access to the system is granted if the user's identity is authenticated, based at least in part on the authentication value. Restricting the user's access can include denying the user's access. The biometric value can be a modified version of the biometric-based data instance, such as a cryptographic hash of the biometric-based data instance. Restricting the user's access to the system and granting the user's access to the system can be based on a modified version of the authentication value, such as a cryptographic hash of the authentication value.

According to another aspect of the present invention, a method of authenticating the identity of a user to determine access to a system includes providing a possession-based data instance, a biometric-based data instance, and a modified version of the biometric-based data instance. The possession-based data instance is applied to the modified version of the biometric-based data instance to generate a recovered data instance. The recovered data instance against the biometric-based data instance to generate a biometric value as a result of a correspondence evaluation. The possession-based data instance and the biometric value are combined to form an authentication value, which is evaluated to determine if the user's identity is authenticated. The user's access to the system is restricted if the user's identity is not authenticated, based at least in part on the authentication value, and granted if the user's identity is authenticated, based at least in part on the authentication value. Restricting the user's access can include denying the user's access. The modified version of the biometric-based data instance can be a first modified version of the biometric-based data instance, in which case the biometric value is a second modified version of the biometric-based data instance, such as a cryptographic hash of the biometric-based data instance. Restricting the user's access to the system and granting the user's access to the system can be based on a modified version of the authentication value, such as a cryptographic hash of the authentication value.

According to an exemplary aspect of the invention, a user's profile ("user profile") determines whether and how the user can encrypt (write) and decrypt (access) an object, which can be, for example, a data instance or a computer program. A user profile includes at least one credential, and each credential includes one or both of an asymmetric key pair: a credential public key (write authority) and a credential private key (access authority).

A user can encrypt (or write) an object with one or more particular credential public keys included in the user's profile, such that subsequent decryption of the encrypted object by another user (or the original user) requires corresponding or otherwise authorized credentials. Accordingly, a user can decrypt an encrypted object if the user possesses, in that user's profile, credentials corresponding to those with which the encrypted object was encrypted. A user can select one or more credentials with which to interact with a particular object or objects in general, or selection of credentials can be automated.

A credential and an object can correspond to a multiple-level access level ("MLA level") to effectuate a partitioned-access scheme, an access-up scheme, or an access-down scheme for encryption and decryption of objects. The MLA level of a credential can be assigned by a domain authority, whereas the MLA level of an object can be assigned based on the object's content or based on the credential(s) used to encrypt the object.

A user profile and one or more credentials included in the profile can be secured, in whole or in part, through one or more levels of encryption. Thus, a user can obtain access to the user's respective user profile and one or more particular credentials contained in the profile by providing the requisite data for respective decryption of the profile or the credentials. The requisite data can be encryption scheme data (such as one or more encryption keys, algorithm identifiers, key qualifiers, or algorithm qualifiers, for example) or instances of keying data used to generate encryption scheme data. Further, a user can provide the requisite data as required or during an identification protocol through which the user obtains access to the computer system. In either case, the requisite data can be preexisting or generated, in whole or in part, such as through a user identification and authorization scheme.

Access controls according to the present invention are enforced using cryptographic algorithms, either proprietary or standards-based. Basic read and write access is correlated to decrypt and encrypt access, respectively, through credentials. These credentials can also define different access sensitivity levels based on defined I&A. Credentials can also control access to applications.

The present invention extends enforcement through read and write access controls, using cryptography, whereas most systems, such as computer operating systems, use software to provide access enforcement. The system of the present invention can be used alone, or with operating system access controls to provide greater security. For example, the present invention can provide cryptographic enforcement of a computer file system read and write controls.

These models offer a flexible approach to I&A and can allow the domain authority to tailor I&A policies for a particular domain. The present invention can be viewed as defining different I&A schemes with different relative assurance levels that can be used within a single domain.

According to a particular aspect of the present invention, in a multi-level access system, a method of securing an object at a multiple-level access level includes receiving, from a user, a profile key encryption key corresponding to the multiple-level access level, selecting an object to secure, and selecting a profile associated with the user. The profile includes a domain value, an encrypted profile encryption key, and a credential. The credential includes an encrypted credential public key, an encrypted credential public key encryption key, and a multiple-level access identifier. The method also includes selecting the credential based on a comparison of the multiple-level access level and the multiple-level access identifier, and generating a working key. Generating the working key includes generating a random value, and binding at least the domain value and the random value together to form the working key. The method also includes encrypting the object with the working key, and generating a random value encryption key. Generating the random value encryption key includes decrypting the encrypted credential public key encryption key with at least the profile key encryption key, decrypting the encrypted credential public key with at least the decrypted credential public key encryption key, generating an ephemeral key pair including an ephemeral private key and an ephemeral public key, generating a shared value based on at least the ephemeral private key and the decrypted credential public key, and generating the random value encryption key based on at least the shared value. The method also includes encrypting the random value with at least the random value encryption key, and providing the encrypted object, the ephemeral public key, and the encrypted random value for an authorized recipient. The profile can also include a profile initialization vector, in which case decrypting the encrypted credential public key encryption key can also include decrypting the encrypted credential public key encryption key with the profile key encryption key and the profile initialization vector. The credential can also include a credential initialization vector, in which case decrypting the encrypted credential public key can include decrypting the encrypted credential public key with the decrypted credential public key encryption key and the credential initialization vector. The multiple-level access level can correspond to the multiple-level access identifier, or the multiple-level access level can be identical to the multiple-level access identifier, lower than the multiple-level access identifier, or higher than the multiple-level access identifier.

According to another aspect of the present invention, a computer system includes a token communicatively connected to a provider. In order to authenticate a user to use the system, the token generates a random value, and sends the random value, a token ID, and a salt value to the provider. The user provides a user password to the provider. The provider generates a derived key based at least in part on the salt value and the password, applies a first key-based hash algorithm, using the derived key, to the token ID to provide a first hash value, and generates a first challenge data instance based at least in part on the random value and the first hash value. The provider also sends the first challenge data instance to the token, generates a token unlock key based at least in part on the derived key, and sends the token unlock key to the token. The token generates a second challenge data instance based at least in part on the random value and a second hash value, wherein the second hash value is stored on the token and is based on the token ID. The token also determines whether the first and second challenge data instances match, and terminates the method if the first and second challenge data instances are determined not to match. If the first and second challenge data instances are determined to match, then an encrypted data transfer system is established between the token and the provider, locked first private data stored on the token is unlocked by the token with the token unlock key, and the user is authenticated for secured use of the system based at least in part on the unlocked first private data.

According to this aspect of the present invention, the derived key can be generated with a password-based encryption algorithm, such as, for example, one based at least in part on PKCS #5. The first hash algorithm can be a hash function-based message authentication code. Generating the token unlock key can include hashing the derived key to provide the token unlock key. Generating the first challenge data instance can include mathematically binding together the first hash value and the random value to provide the first challenge data instance. Generating the first challenge data instance can include mathematically binding together the first hash value and the random value to provide the first challenge data instance, and generating the second challenge data instance can include mathematically binding together the second hash value and the random value to provide the second challenge data instance. Generating the first challenge data instance can include mathematically binding together the first hash value and the random value to provide a first resulting value, and hashing the first resulting value to provide the first challenge data instance, and generating the second challenge data instance can include mathematically binding together the second hash value and the random value to provide a second resulting value, and hashing the second resulting value to provide the second challenge data instance. Establishing the encrypted data transfer system can include generating, by at least one of the token and the provider, a shared key, which can be, for example, a shared session key, and which can be generated based at least in part on shared data that includes a Diffie-Hellman parameter set.

According to this aspect of the present invention, the provider can also combine a message and a present message value to provide a modified message, encrypt the modified message, using a shared key, to provide an encrypted message, and combine the modified message and the random value to provide a first pre-hash value. The provider also can apply the first key-based hash algorithm, using the first hash value, to the first pre-hash value to provide a third hash value, combine the encrypted message and the third hash value to provide a signed message, and send the signed message to the token. The token can extract the encrypted message and the third hash value from the signed message received from the provider, decrypt the encrypted message, using the shared key to provide the modified message, extract the message and the present message value from the decrypted encrypted message, and combine the message, the present message value, and the random value to provide a second pre-hash value. The token also can apply the first key-based hash algorithm, using the second hash value, to the second pre-hash value to provide a signing hash value, and validate the message, if the signing hash value and the third hash value match and the present message value is greater than a prior message value stored on the token.

According to this aspect of the invention, the token can also combine a message and a present message value to provide a modified message, encrypt the modified message, using a shared key, to provide an encrypted message, and combine the modified message and the random value to provide a first pre-hash value. The token can also apply the first key-based hash algorithm, using the second hash value, to the first pre-hash value to provide a third hash value, combine the encrypted message and the third hash value to provide a signed message, and send the signed message to the provider. The provider can extract the encrypted message and the third hash value from the signed message received from the token, decrypt the encrypted message, using the shared key to provide the modified message, extract the message and the present message value from the decrypted encrypted message, and combine the message, the present message value, and the random value to provide a second pre-hash value. The provider also can apply the first key-based hash algorithm, using the first hash value, to the second pre-hash value to provide a signing hash value, and validate the message, if the signing hash value and the third hash value match and the present message value is greater than a prior message value stored on the provider.

According to this aspect of the invention, unlocking the locked first private data can include decrypting the locked first private data with the token unlock key. The unlocked first private data can include at least one user credential associated with the user, and authenticating the user can include providing at least one of the at least one user credential to the system to grant the user cryptographic reading authority. The unlocked private data can include at least one user credential associated with the user, and authenticating the user can include providing at least one of the at least one user credential to the system to grant the user cryptographic writing authority.

Also according to this aspect of the present invention, establishing the encrypted data transfer system can include encrypting messages exchanged between the token and the provider with an encryption key. In this case, the token can also send an encrypted instance of the encryption key and an encrypted user profile associated with the user to the provider. The provider then applies a key derivation function to the derived key and the first hash value to provide a cryptographic key, decrypts the encrypted instance of the encryption key, decrypts the encrypted profile with the encryption key, and provides the decrypted user credential to the system to grant the user at least one of cryptographic reading authority and cryptographic writing authority.

According to this aspect of the present invention, the system can also include a biometric reader communicatively connected to the provider, in which case the locked first private data includes an encrypted biometric template. The token can send the encrypted biometric template to the provider. The provider can decrypt the encrypted biometric template with the derived key. The user can provide a biometric sample via the biometric reader to the provider. The token can determine whether the biometric sample corresponds to the decrypted biometric template. The provider can then terminate the method, if the biometric sample is determined not to correspond to the decrypted biometric template. If the biometric sample is determined to correspond to the decrypted biometric template, the provider can apply either the first key-based algorithm or a second key-based algorithm, using the derived key, to the decrypted biometric template to provide a third hash value, generate a third challenge data instance based at least in part on the third hash value and the random value, and send the third challenge data instance to the token. The token can then generate a fourth challenge data instance based at least in part on the random value and a fourth hash value. The fourth hash value is stored on the token and is based on the biometric template. The token can then determine whether the third and fourth challenge data instances match, and terminate the method if the third and fourth challenge data instances are determined not to match. If the third and fourth challenge data instances are determined to match, the token can unlock locked second private data stored on the token with at least a portion of the unlocked first private data. In this case, authenticating the user for secured use of the system further requires that the third and fourth data instances are determined to match.

According to another aspect of the present invention, the system further includes a biometric reader communicatively connected to the token, and the locked first private data includes an encrypted biometric template. The user provides a biometric sample via the biometric reader to the token. The token then decrypts the encrypted biometric template with the derived key, determines whether the biometric sample corresponds to the decrypted biometric template, and terminates the method if the biometric sample is determined not to correspond to the decrypted biometric template. If the biometric sample is determined to correspond to the decrypted biometric template, the token unlocks locked second private data stored on the token with at least a portion of the unlocked first private data. In this case, authenticating the user for secured use of the system further requires that the biometric sample is determined to correspond to the decrypted biometric template. The biometric reader can be integral with the token.

According to another aspect of the present invention, a computer system includes a token communicatively connected to a provider. The token sends a token ID, a salt value, an encrypted encryption key, and an encrypted user profile to the provider. The user provides a user password to the provider. The provider generates a derived key based at least in part on the salt value and the password, applies a first key-based hash algorithm, using the derived key, to the token ID to provide a first hash value, and applies a key derivation function to the derived key and the first hash value to provide a cryptographic key. The provider then decrypts the encrypted instance of the encryption key, decrypts the encrypted profile with the encryption key, and provides the decrypted user credential to the system to grant the user at least one of cryptographic reading authority and cryptographic writing authority.

BRIEF DESCRIPTION OF THE DRAWINGS

FIG. 7 is a table showing a summary of combinations of read and write permissions.

FIG. 11 is a table showing an exemplary set of credentials that are available for a given log-in MLA level and defined access type.

FIG. 12 is a table showing exemplary respective relationships between credential private key encryption keys and between credential public key encryption keys.

FIG. 13 is a table showing an exemplary encrypted member profile and keys according to the present invention.

DETAILED DESCRIPTION OF THE INVENTION

The invention will now be described in more detail by way of example with reference to the illustrative embodiments shown in the accompanying figures. It should be noted that the following described embodiments are only presented by way of example and should not be construed as limiting the inventive concept to any particular configuration or order.

Figure 1:
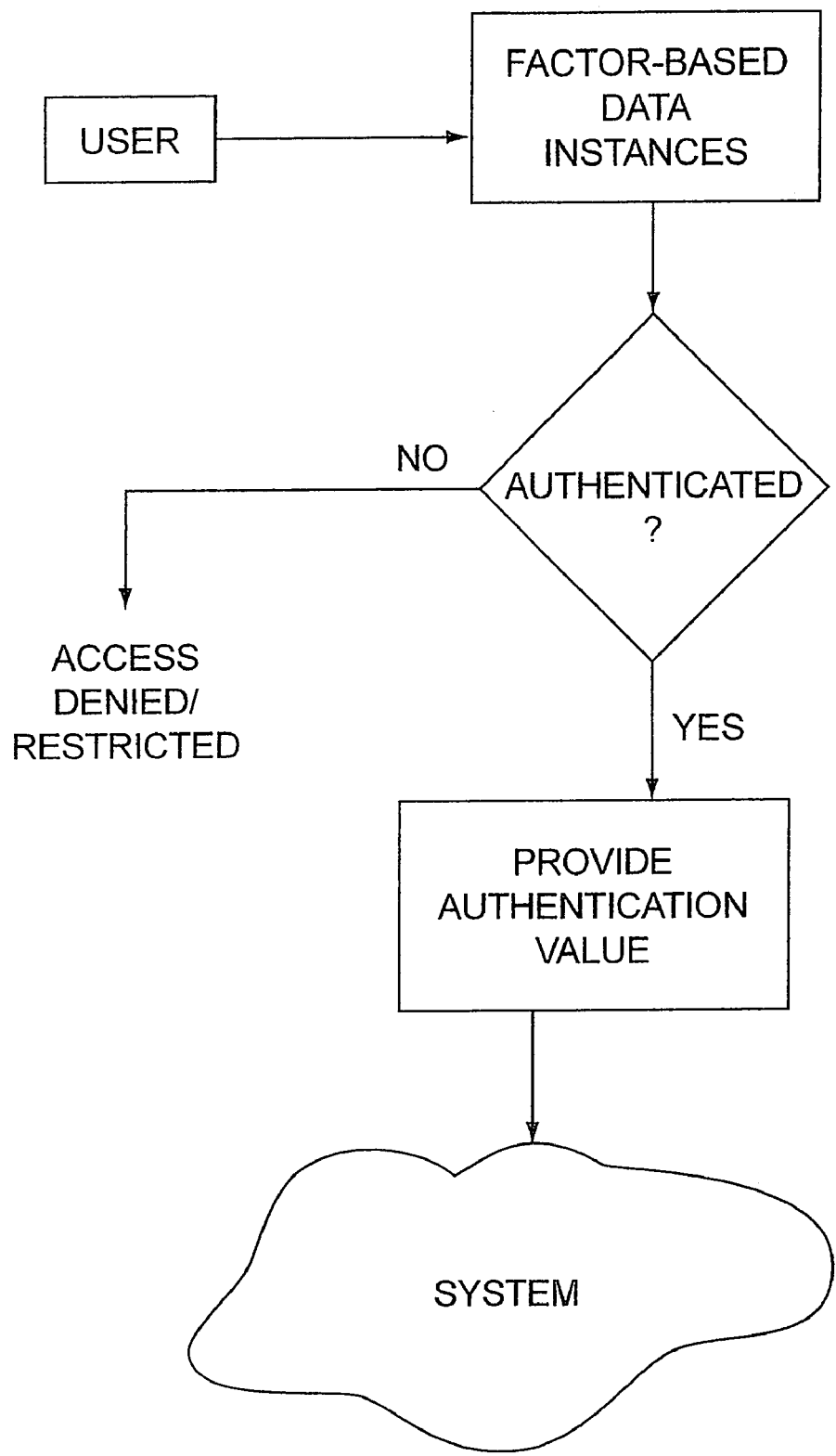
FIG. 1 is a block diagram showing an overview of the identification process of the present invention.

FIG. 1 shows an overview of the identification process of the present invention, in block diagram form. As shown, a user provides a number of factor-based data instances, which are used to determine the authenticity of the identity of the user in order to authorize his or her access to system resources. If the authentication process fails, access is denied. If the user's identity is authenticated, an authentication value is provided to the system to allow the user access to the appropriate system resources. Alternatively, when the determination is made as to whether the user's identity has been authenticated, this determination result is provided to the system as the authentication value, regardless of the success or failure of the authentication. The system would then respond based on the authentication value, whether to deny access or restrict access to the user.

Figure 2:
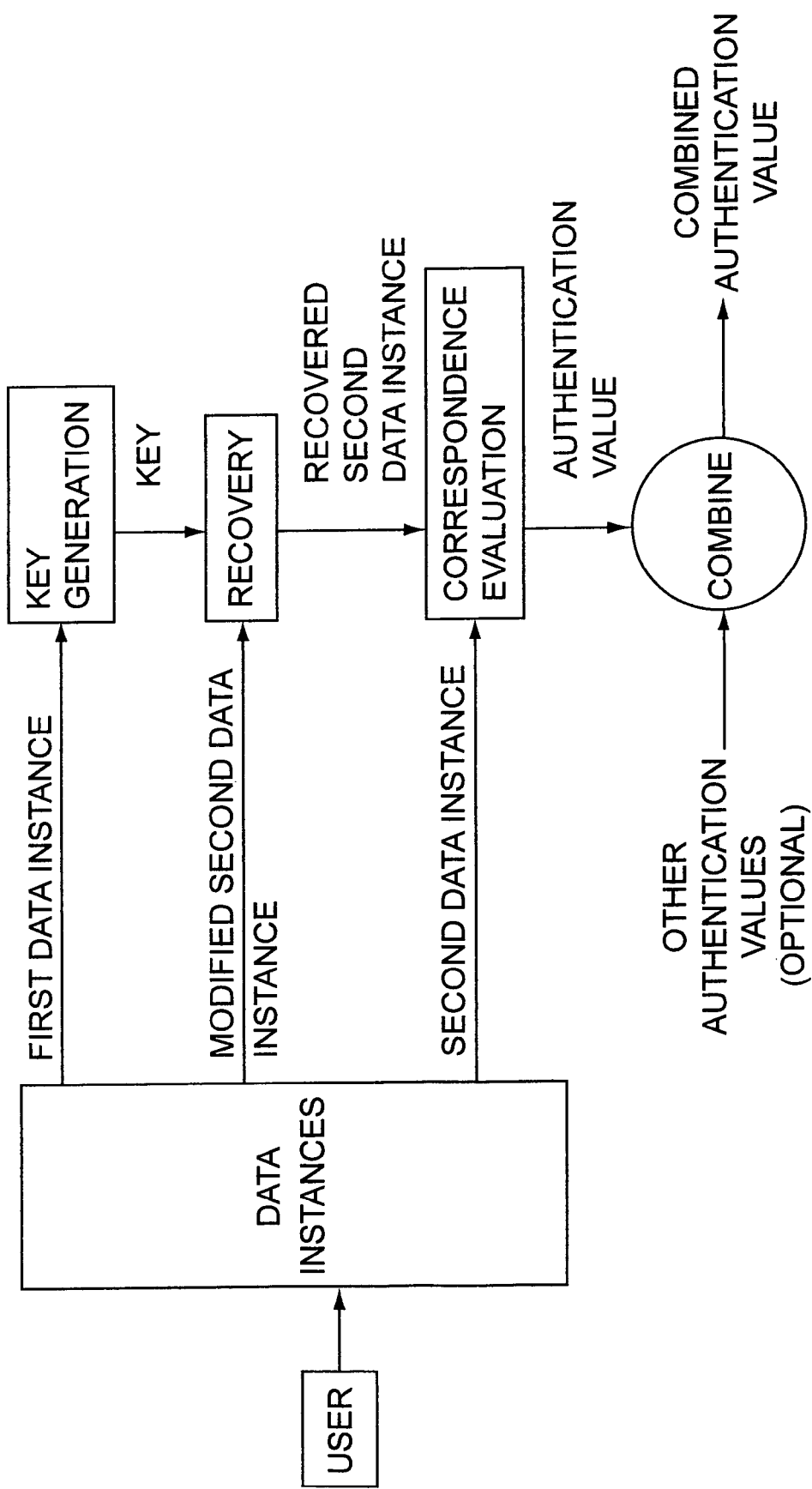
FIG. 2 is a block diagram showing an exemplary process of authenticating the identity of a user.

FIG. 2 shows an exemplary process of authenticating the identity of a user. The user provides a number of factor-based data instances to the identification and authentication process. These data instances can be provided at the time that the authentication determination is being made, or have already been provide in the past. If the factors have already been provided, manipulations can have been performed on one or more of the data instances, such that they are stored in modified form. For example, one or more of the data instances can have been encrypted.

As shown, an exemplary authentication process includes creating a key based on a first data instance. A modified second data instance is provided, which undergoes a manipulation to recover the unmodified second data instance, using the key derived from the first data instance. The unmodified second data instance is provided, and a correspondence evaluation is performed on the unmodified second data instance and the recovered second data instance. The result of the correspondence evaluation is then provided to the system as the authentication value. Alternatively, other correspondence evaluation results are provided and combined in some manner with the first correspondence evaluation, to produce the authentication value.

User identification can be based upon any of many different factors—who you are (biometrics), what you know (knowledge-based data, such as a PIN or pass phrase), and what you possess (a token), where you are (location-based data, such as a geographic or virtual address), and "when you are" (time-based data), for example. Each factor has advantages and disadvantages associated with its use in restricting access to authorized users. In terms of security, a user identification process combining more than one of these factors is stronger than a process that uses just one factor.

The present invention provides a method of validating a user for access to a system based on at least two of these factors. The present invention also provides an apparatus that validates a user for access to a system based on at least two of these factors. The present invention also provides a computer-readable medium that stores instructions for controlling a computer to validate a user for access to a system based on at least two of these factors. A validated key is created according to the system of the present invention by binding two or more selected factors, and provided for the user to access the system. A validated key can be used directly, for example, as an access code, or indirectly, for example, to decrypt or allow access to an access code, or as keying data in a key management scheme to access the system.

In the user identification process according to one aspect of the present invention, the goal is to derive a unique value—the Profile Key Encryption Key (PKEK)—from the user identification process. The PKEK is used as a cryptographic key to encrypt and decrypt keying material and critical security parameters. This data must be protected, yet made available to an authorized user and restricted from unauthorized users. Each identification factor contributes a value to the identification process, in some cases a unique value, that is reflected in the final value used to derive the unique PKEK. The process must also be repeatable, that is, result in regeneration of the same PKEK for a successful identification. Furthermore, there should be a way of testing whether the regenerated PKEK is the correct PKEK.

Each of the factors and combinations of factors must be assessed for its usefulness within the identification process. Exemplary factors are discussed below.

Knowledge-Based Factors: A knowledge-based factor such as a PIN, password, or pass phrase can be used to derive a repeatable, unique value. However, knowledge-based factors have security limitations regarding aspects such as usage and management. Generally stronger security can result when a password is combined with other factors for identification.

In regards to a password, policies can be defined, such as password obsolescence, minimum number of characters, and other parameters as an attempt to enforce good password practices. Such policies are well known, and have been set forth in certain guidelines such as, for example, those established in Federal Information Processing Standards (FIPS) Publication 112, dated May 30, 1985. A unique, repeatable value can be derived from a password by using certain algorithms such as, for example, the Public-Key Cryptographic Standards (PKCS) #5 algorithm, or that set forth in U.S. Pat. No. 6,075,865. For maximum effectiveness, it is assumed that only the user knows the password.

Biometric Factors: Biometrics, or biological data, while avoiding some of the limitations associated with a knowledge-based factor, are troublesome in the respect of being able to derive a unique, repeatable value. The derived value from a biometrics measurement is usually generated as an analog value that undergoes an analog-to-digital conversion. The analog values are rarely exactly the same from measurement to measurement. In general, a digital representation of the analog measurement, called a template, is created such that two analog measurements from the same person will result in template values that are "close" to each other. That is, the difference between the two values falls within a predetermined tolerance range. During biometrics verification, if a verification template is close to the enrollment template with some measured assurance, it is determined that the two analog measurements were taken from the same entity. This is the basis of the biometrics identification process. But, the identification process by itself does not yield a repeatable value that can be used to derive a cryptographic key.

The present invention does not provide a method to yield a repeatable value from a biometric process, but can use the biometric template within different user identification models. A cryptographic key can be bound to this template when it is created. This key cannot be derived from the template alone. However, a subsequent biometrics measurement, if successful, will recover this key. This key value can be used in the derivation of the PKEK.

Possession-Based Factors: The token can be any tangible item that is able to store or represent data and that has a hard-coded, (that is, written at fabrication and unchangeable) unique serial number or other identifying value. A mechanism based on use of a unique token number can provide assurance that a correct token was used.

A unique value can be stored on a token. However, this value must be protected yet still allow access by the authorized user. To maintain protection of the unique value during the identification process, a pass phrase or biometric process can be used. An RFID material, such as that described in U.S. Pat. No. 6,229,445, the disclosure of which is incorporated herein by this reference, can also be added to the token to be used in a card identity process, to provide a unique signature from which the token serial number can be derived, but can exhibit similar limitations as found in the biometric solutions. The token serial number can be provided to the user identification process in deriving a PKEK.

The present invention can advantageously use a smart card as a token. For example, an enhanced smart card can be used as a unique token. This particular token provides several features that contribute to the user identification process. For example, a long (128-bit or more) serial number can be securely embedded within. The token includes a processor that is able to use this serial number, which cannot be derived external to the token. If the identification process must be executed external to the token's processor, the serial number should be hashed or otherwise modified for transmission to the host processor. Also, the token can be host to one or more cryptographic processes.

As stated previously, a user identification process that uses multiple factors should be able to combine the strengths of all the factors while avoiding the weaknesses of each factor. There are several variations according to which a user identification process can be configured. Three variations are presented below as examples. Other variations, using different combinations of factors, are possible. The first exemplary embodiment described below features three-factor user identification; the second exemplary embodiment features two-factor user identification (token and biometric); and the third exemplary embodiment features two-factor identification (token and biometric with an encrypted template). These embodiments are presented only as illustrations of the present invention, and are limiting of the scope of the invention. For example, it is contemplated that factors other than those shown in the exemplary embodiments can be added or substituted, that other tokens can be used in place of those shown in the exemplary embodiments, and that biometric instances other than those shown in the exemplary embodiments can be added or substituted.

First Exemplary Embodiment

Figure 3:
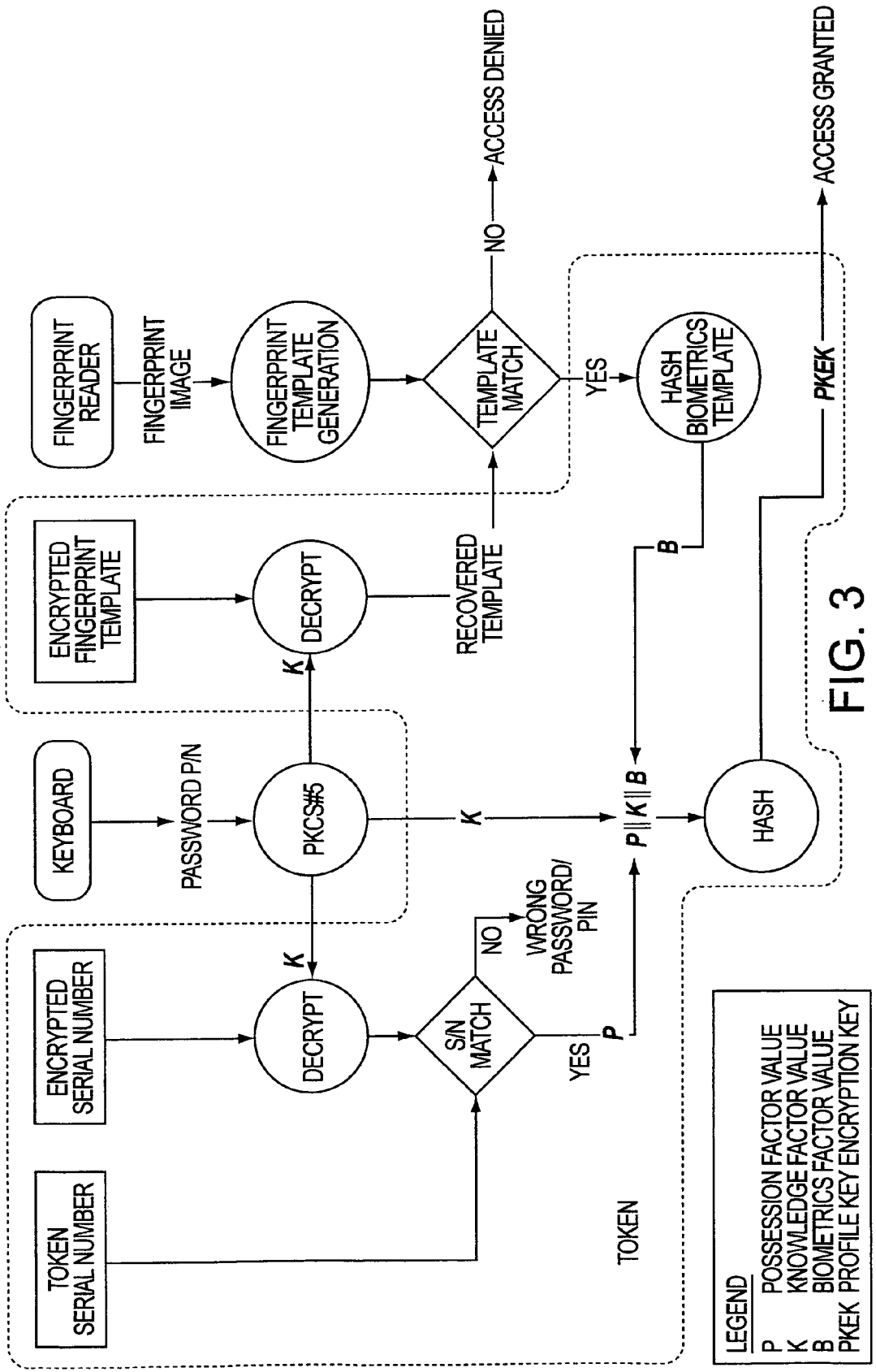
FIG. 3 is a block diagram showing an exemplary three-factor user identification scheme according to the present invention, using a smart token, a password, and fingerprint data, with a template on the token.

As shown in FIG. 3, a first exemplary identification process of the present invention includes knowledge-based, possession-based, and biometric-based factors. In this particular embodiment, these factors take the form of a password/PIN, a token, and a fingerprint reading, respectively. The identification process for a session proceeds as follows.

The user provides a token and a password, either in response to a prompt or unprompted to begin a session. A system algorithm, such as PKCS#5, is used to create a key value, K, from the password. The key K is used to decrypt the encrypted token serial number that is stored on the token. Alternatively, an encrypted member ID, stored on the token, is used as a password check. The decrypted value is compared against the plaintext serial number or the entered member ID. If the two values match or otherwise correspond in a predetermined manner, it is determined that the password has been entered correctly. If there is no correspondence, it is determined that the password has been entered incorrectly, and access is denied. Password policy for the system dictates the procedure at this point. For example, the password entry can be tried again but a count of invalid password attempts is maintained and checked against the maximum number of tries. The policy establishes the number of invalid attempts that can be made before access is totally denied. If a token serial number is used for a successful password check, the decrypted value, P, is used as an input to the PKEK derivation process.

During enrollment, a biometrics template is created for fingerprint verification according to this exemplary embodiment; in other, similar, embodiments, an alternative or additional biometric instance can be utilized. The template is protected by encrypting it with the password-derived key. If plain fingerprint template matching is being used, the enrollment template resides in encrypted form on the token. The key, K, from the password decryption process is used to decrypt this template. If a Bioscrypt™ or similar system, as previously described, is used instead, the template is already in plaintext form and therefore is not decrypted. The password must be available to decrypt the enrollment template before it can be used for successful biometrics verification. The knowledge factor part of the identity process is encryption-enforced, but the biometrics factor part is enforced logically. That is, the encrypted enrollment template is decrypted using the key, K, from the password decryption process. The user inserts a finger in a fingerprint reader at the identification site, where a fingerprint image is read and a verification template is generated. The enrollment and verification templates are compared and evaluated for a match to within the system's predetermined threshold. If the match threshold is not satisfied, access is denied. Subsequent readings can be allowed, according to the system's selected policy, similar to the manner in which repeated password entries can be allowed. Upon successful biometrics verification, the decrypted enrollment template is hashed to produce a hashed template, B, which is used as an input to the PKEK derivation process. If a Bioscrypt™ or similar system is used, then the key resulting from the successful fingerprint match is used as B.

The values P, K, and B are then bound or otherwise combined in some manner, in order to produce the PKEK. This is preferably performed by a processor on-board the token. For example, in the exemplary embodiment shown in FIG. 3, the values P, K, and B are concatenated in that order. A cryptographic hash of the concatenated values is used as the PKEK.

In this embodiment, P, B, and PKEK are generated on the token. The password validity determination and biometric enrollment template decryption functions take place on the token as well. The PKEK preferably stays resident on the token for decryption of keying material and other critical security parameters (CSPs), when needed by the key management system. Domain keying material and CSPs that are needed to operate in a domain reside on the token. Thus, the key management system will prompt the user to provide the token and password whenever token protected (non-public) data or processes are required by an application. The keying material and CSPs are encrypted using a master key that is encrypted with the PKEK. The two-step encryption at this point offers variability to the identification process. A password can change without having to re-encrypt all of the domain keying material and CSPs, and instead require that only the master key be re-encrypted.

Second Exemplary Embodiment

Figure 4:
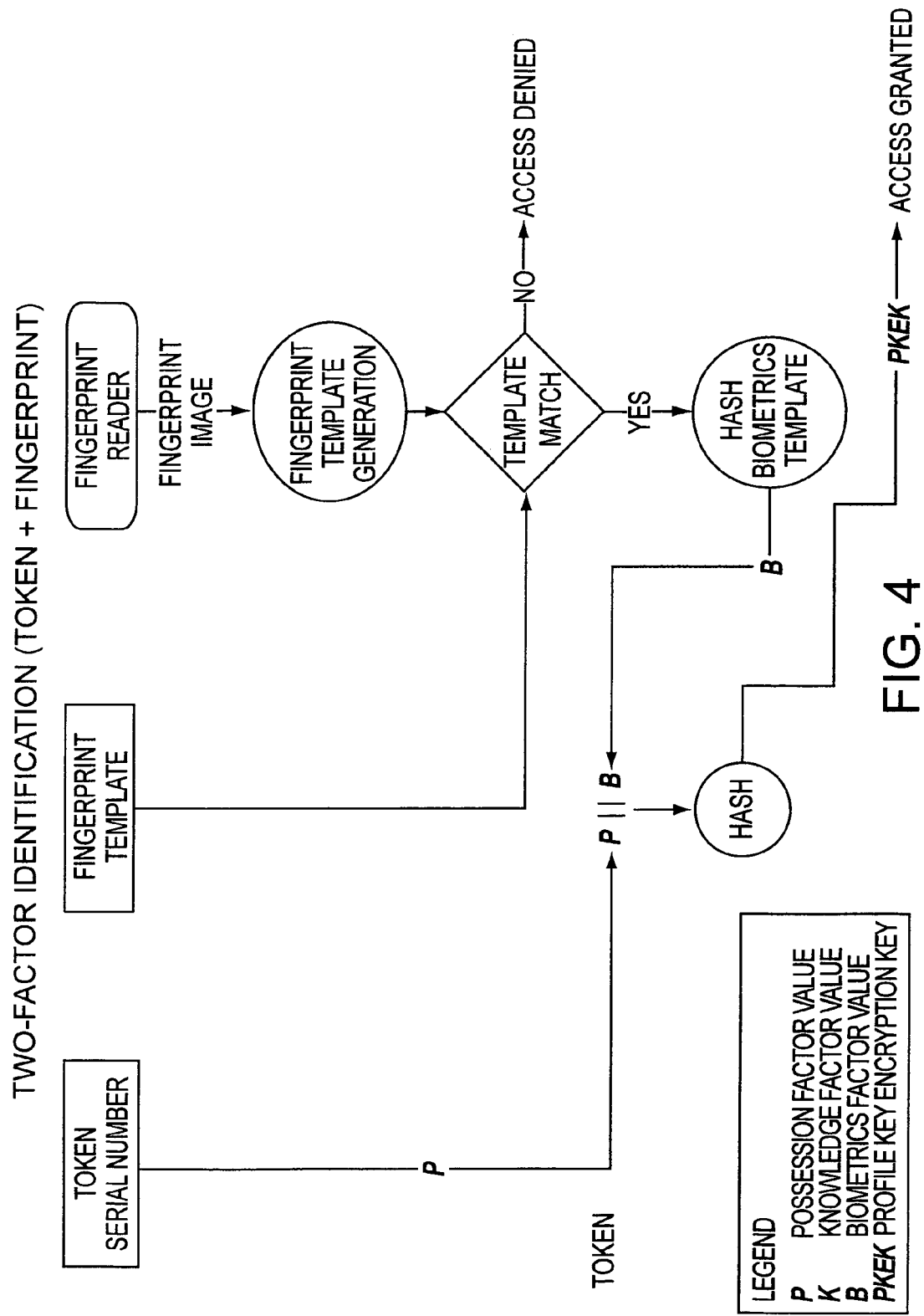
FIG. 4 is a block diagram showing an exemplary two-factor user identification scheme according to the present invention, using a smart token and fingerprint data, with a template on the token.

As shown in FIG. 4, a second exemplary identification process of the present invention includes knowledge-based and biometric-based factors. In this particular embodiment, these factors take the form of a password/PIN and a fingerprint reading, respectively. The identification process for a session proceeds as follows.

The user provides a token, either in response to a prompt or unprompted to begin a session. The token stores a serial number, P, which is used as an input to the PKEK derivation process.

During enrollment, a biometrics template is created for fingerprint verification according to this exemplary embodiment; in other, similar, embodiments, an alternative or additional biometric instance can be utilized. If plain fingerprint template matching is being used, the enrollment template resides on the token. If a Bioscrypt™ or similar system, as previously described, is used instead, this template is stored on the token. The user inserts a finger in a fingerprint reader at the identification site, where a fingerprint image is read and a verification template is generated. The enrollment and verification templates are compared and evaluated for a match to within the system's predetermined threshold. If the match threshold is not satisfied, access is denied. Subsequent readings can be allowed, according to the system's selected policy, similar to the manner in which repeated password entries can be allowed according to the first exemplary embodiment described above. Upon successful biometrics verification, the decrypted enrollment template is hashed on the token to produce a hashed template, B, which is used as an input to the PKEK derivation process. If a Bioscrypt™ or similar system is used, then the key resulting from the successful fingerprint match is used as B.

The values P and B are then bound or otherwise combined in some manner, in order to produce the PKEK. This is preferably performed by a processor on-board the token. For example, in the exemplary embodiment shown in FIG. 4, the values P and B are concatenated in that order. A cryptographic hash of the concatenated values is used as the PKEK.

In this embodiment, B and PKEK are generated on the token. The PKEK preferably stays resident on the token for decryption of keying material and other CSPs, when needed by the key management system. Domain keying material and CSPs that are needed to operate in a domain reside on the token. Thus, the key management system will prompt the user to provide the token and password whenever token protected (non-public) data or processes are required by an application. The keying material and CSPs are encrypted using a master key that is encrypted with the PKEK. The two-step encryption at this point offers variability to the identification process. A password can change without having to re-encrypt all of the domain keying material and CSPs, and instead require that only the master key be re-encrypted.

Third Exemplary Embodiment

Figure 5:
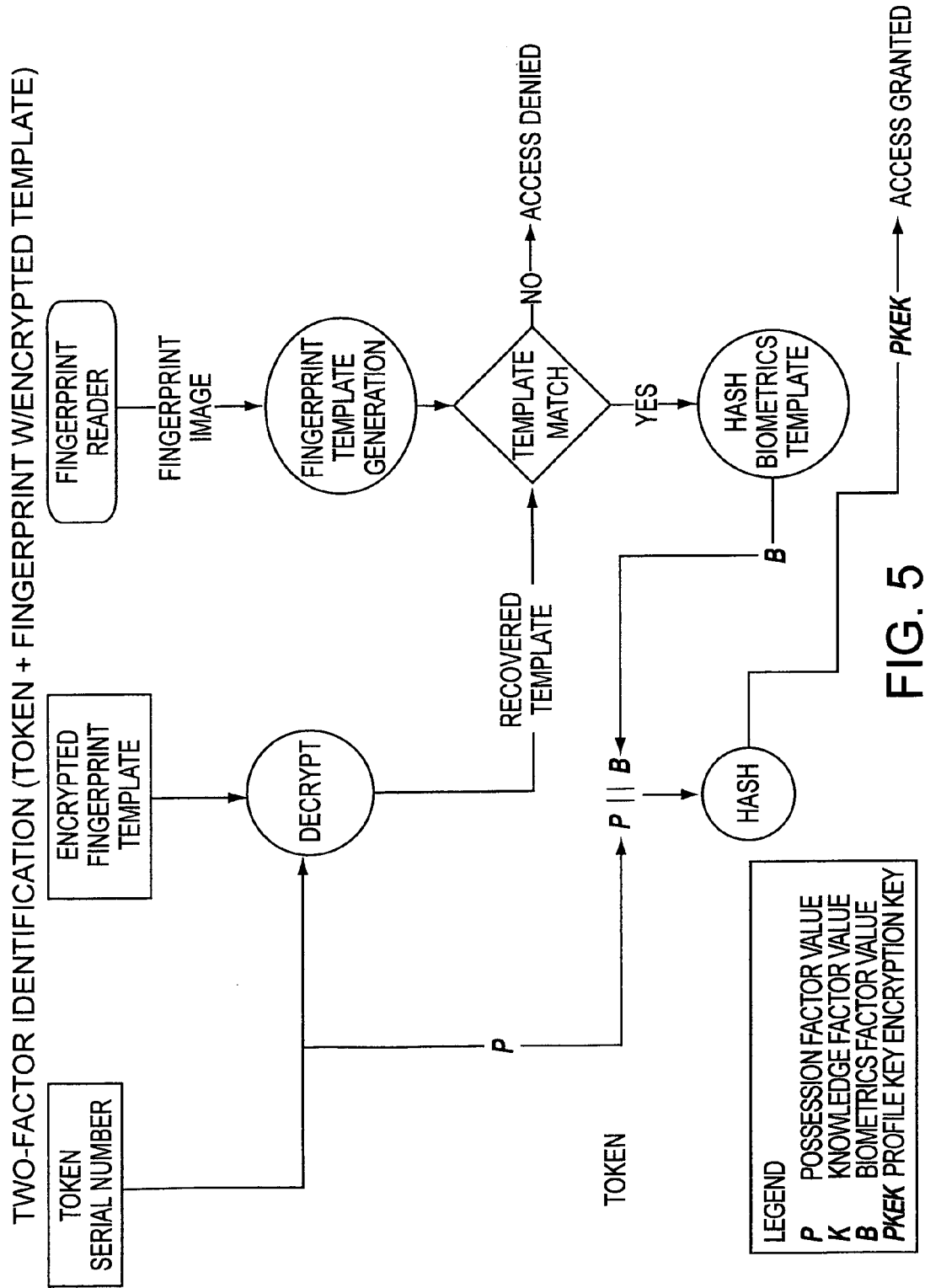
FIG. 5 is a block diagram showing an exemplary two-factor user identification scheme according to the present invention, using a smart token and fingerprint data, with an encrypted template on the token.

As shown in FIG. 5, a third exemplary identification process of the present invention includes knowledge-based and biometric-based factors. This process is similar to that of the previous embodiment; here the fingerprint template is stored in encrypted form on the token, using the token serial number as the key. The token will first decrypt the template before template matching takes place.

In this particular embodiment, these factors take the form of a password/PIN and a fingerprint reading, respectively. The identification process for a session proceeds as follows.

The user provides a token, either in response to a prompt or unprompted to begin a session. The token stores a serial number, P, which is used as an input to the PKEK derivation process.

During enrollment, a biometrics template is created for fingerprint verification according to this exemplary embodiment; in other, similar, embodiments, an alternative or additional biometric instance can be utilized. The template is protected by encrypting it with a key derived from the token serial number, P. If plain fingerprint template matching is being used, the enrollment template resides in encrypted form on the token. If a Bioscrypt™ or similar system, as previously described, is used instead, the template is already in plaintext form and therefore is not decrypted. The serial number must be available to decrypt the enrollment template before it can be used for successful biometrics verification. The encrypted enrollment template is decrypted using the key, P, from the token serial number. The user inserts a finger in a fingerprint reader at the identification site, where a fingerprint image is read and a verification template is generated. The enrollment and verification templates are compared and evaluated for a match to within the system's predetermined threshold. If the match threshold is not satisfied, access is denied. Subsequent readings can be allowed, according to the system's selected policy, similar to the manner in which repeated password entries can be allowed in the first exemplary embodiment. Upon successful biometrics verification, the decrypted enrollment template is hashed to produce a hashed template, B, which is used as an input to the PKEK derivation process. If a Bioscrypt™ or similar system is used, then the key resulting from the successful fingerprint match is used as B.

The values P and B are then bound or otherwise combined in some manner, in order to produce the PKEK. This is preferably performed by a processor on-board the token. For example, in the exemplary embodiment shown in FIG. 5, the values P and B are concatenated in that order. A cryptographic hash of the concatenated values is used as the PKEK.

In this embodiment, P, B, and PKEK are generated on the token. The PKEK preferably stays resident on the token for decryption of keying material and other CSPs, when needed by the key management system. Domain keying material and CSPs that are needed to operate in a domain reside on the token. Thus, the key management system will prompt the user to provide the token and password whenever token protected (non-public) data or processes are required by an application. The keying material and CSPs are encrypted using a master key that is encrypted with the PKEK. The two-step encryption at this point offers variability to the identification process. A password can change without having to re-encrypt all of the domain keying material and CSPs, and instead require that only the master key be re-encrypted.

The particular embodiments described herein are presented to facilitate disclosure of the present invention, and are not limiting of the scope of the invention as contemplated by the inventors. The invention as recited in the appended claims, therefore, should be interpreted to be given the broadest interpretation that is reasonable in vie of the known prior art. Various modifications and variations of the described embodiments fall within the scope of the present invention.

For example, knowledge-based data provided by the user need not be a PIN or password. This data can be any data that is known to the user and that be provided by the user as verification. This data can be connected to another piece of data and provided in response to an inquiry, such as a mother's maiden name, or can have a significance that is known only to the user, such as the word "rosebud". If provided in response to an inquiry, the inquiry and response can change for each session, but in every case the correct response will provide the key or other data instance required by the system.

Likewise, possession-based data need not be stored on the token particularly described herein. The tangible medium on which the possession-based data is stored can also be, for example, a PCMCIA card, a magnetic-stripe card with processing capability (if necessary), a personal data assistant, a laptop computer, any data carrier, a tattoo, a key or watch fob, or any object or device that is capable of storing the possession-based data and providing any additional functionality required of the identification scheme.

Biometric data need not be limited to fingerprint image data. Any biometric data that can be repeatedly, reliably captured and which does not vary appreciably between captures is contemplated as suitable for use with the present invention. For example, the present invention can advantageously use retinal scan data, voice print data, brainwave scan data, handwriting sample data and vector data, and DNA sample data as biometric inputs on which to generate templates.

More than one factor-based data instance of any type can be required. For example, two tokens can be required for certain levels of access, to enforce a rule that more than one person having a specific authority be present before allowing a particular access to occur. Alternatively, according to the exemplary embodiment shown in FIG. 3, the token serial number and the biometric template for a user can be provided on separate tokens rather than one. Likewise, two biometric readings can be required, either from two different users, or two different types of readings from the same user.

Further, other types of data factors can be used, in addition to those described herein or substituted for those described herein. For example, a location-based factor can be used as an input, to convey location information about the user and to restrict system access based on location factors. The location data can relate to a geographical, physical, or virtual location of the user. For example, this data can correspond to longitude, latitude, altitude, Internet protocol address, MAC address, node ID, terminal ID, time zone, country, zip code, area code, or any identifier that can locate a user. This information can be provided automatically, for example, in the case of a terminal ID. The information can be provided by the user, for example, in the case of a zip code or street address. The information can also be provided through the use of an external device, such as a global positioning system (GPS) receiver.

Time-based factors can also be used as inputs to the present invention. This time-based data can correspond to the actual or virtual time of an actual or expected occurrence of an event, such as, for example, when the user is seeking access to a system, the last time the user (or any user) sought access to a system or logged out of a system, or five minutes before a specified event. This time-based data can be measured in any of a number of different ways, such as by counts, units, months, weeks, days, hours, or any other conceivable time units. A user provides time-based data, in a passive or active manner, via a time-measuring or reporting device, such as, for example, a computer clock, a counter, or a material degradation measuring system. User access to a time-measuring device can be limited to prevent spoofing or hacking of time-based data. For example, a time-measuring device can be embedded on a token (such as a smartcard), or located in a secured or remote location.

Concatenation has been presented as an exemplary method of binding two or more values to form an authentication value, such as a PKEK. However, binding can encompass any manner of generating a resultant value from two or more source values in a consistent, repeatable manner. For example, at least a portion of each source value, or a value derived from each source value or referenced by each source value, can combined mechanically (such as by bitwise manipulation) or mathematically (such as by hashing or randomization) in a consistently repeatable manner. Also, binding can be reversible (the bound values are reliably derivable from the resultant value) or irreversible (one or more bound values are not reliably derivable). Further, the level of complexity of binding can range from simple (such as by concatenation) to complex (such as by multiple concatenations, encryptions and references).

Figure 6:
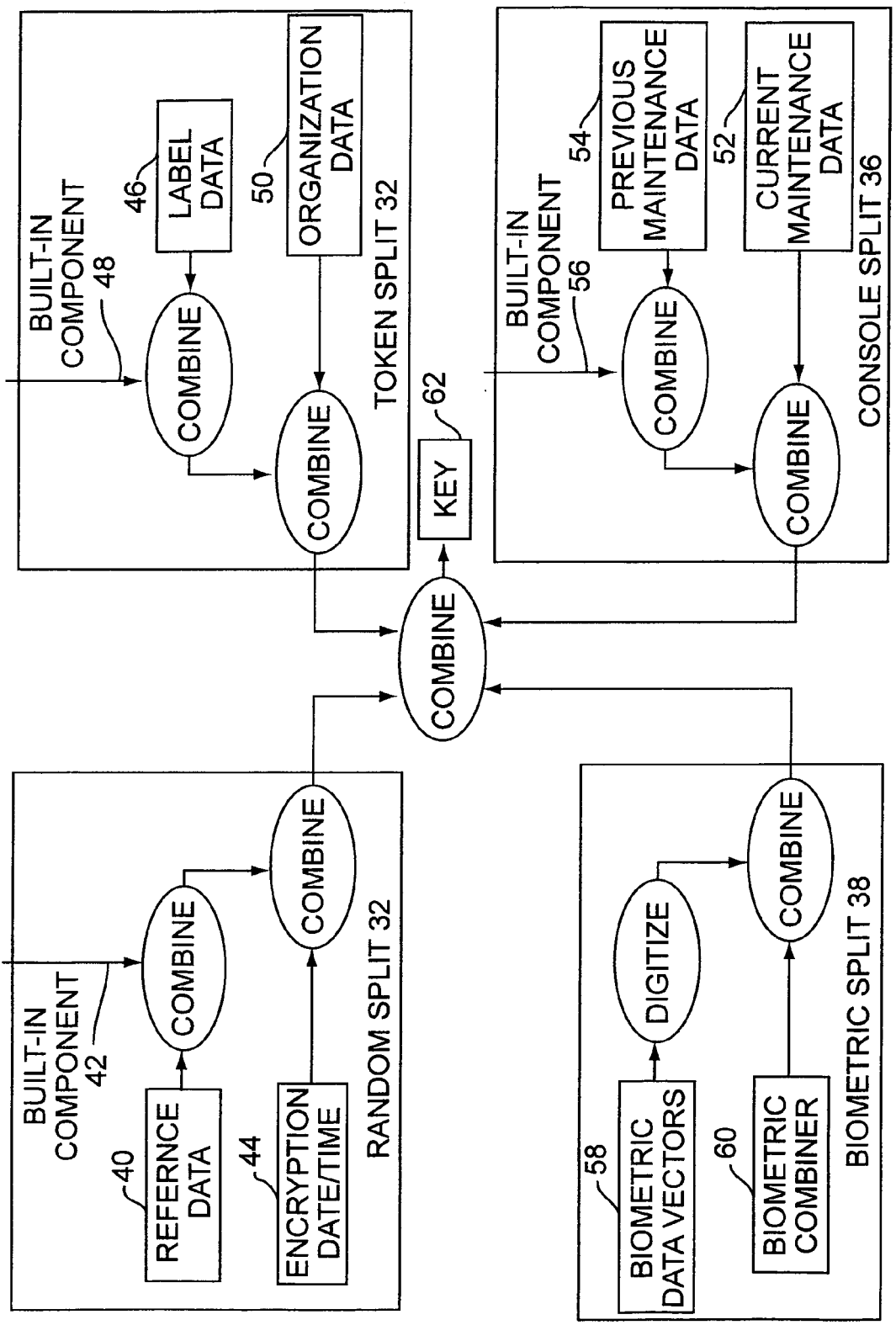
FIG. 6 is a block diagram showing an exemplary binder according to the present invention.

An exemplary form of binding to form a key is described below. As shown in FIG. 6, the source values to be bound are provided to split generators as seeds. The split generators produce split values based on the seeds, according to a function that is predetermined for the split generators. The resulting splits are then combined or bound, for example by randomization. The output value is the bound value of the source values. FIG. 6 shows inputs B, K, and P, representative of outputs of the exemplary embodiment shown in FIG. 3.

The figure also shows optional random and maintenance seed inputs. The random key split can be randomly or pseudo-randomly generated. The maintenance split can be provided to facilitate updates to the system. The manner of binding of the splits is such that the resultant value can take the form of a stream of symbols, a group of symbol blocks, an N-dimensional key matrix, or any other form usable by the particular system.

The optional random split provides a random component to the output. This split is randomly or pseudo-randomly generated based on a seed that is provided by any source as reference data. For example, when a user attempts to log on to a system, the date and time of the user's log-on attempt, represented in digital form, can be used as a seed to generate the split. That is, the seed can be provided to a pseudorandom sequence generator or other randomizer to produce the random split. Such pseudorandom sequence generators are well known in the art. For example, a simple hardware implementation can include a shift register, with various outputs of the register XORed and the result fed back to the input of the register. Alternatively, the seed can be combined, or randomized, with a built-in component, such as a fixed seed stored on the token or elsewhere. The randomization can be performed, for example, by applying an algorithm to the generated seed and the stored fixed seed. This result can be further randomized with, for example, a digital representation of the date and time of the encryption, in order to produce the random split.

The optional maintenance split is derived from a changing value stored at a user space, such as on a system console. Maintenance data, such as the checksum taken from a defragmentation table set, can be used to produce such changing values. For example, the current maintenance data can be randomized with particular previous maintenance data. Alternatively, all previous maintenance data can be randomized with a built-in component stored at the origination space, the results of which are XORed together and randomized with the current maintenance data. The randomization result of the changing value is the maintenance split.

The built-in split components described herein can be static in that they do not change based on uncontrolled parameters within the system. They can be updated for control purposes, however. For example, the built-in split components can be changed to modify the participation status of a particular user. The split component can be changed completely to deny access to the user. Alternatively, only a single prime number divisor of the original split component can be taken from the split component as a modification, in order to preserve a legacy file. That is, the user will be able to access versions of the file created prior to the modification, but will not be allowed to change the file, effectively giving the user read-only access. Likewise, modification of the split component can be effected to grant the user broader access.

Once the splits have been generated, they can be bound together to produce the authentication value. It is contemplated that splits other than those specifically described herein can be combined in forming the authentication value. The total number of splits can also vary, and these splits can be used to build a key matrix to add to the complexity of the system. The authentication value should be in a form suitable for use in the particular system. That is, different fields in the key can have different functions in the protocol of the communication, and should be arranged accordingly within the authentication value.

The hardware required to effectuate the process of the present invention depends on the factor-based data used by the particular embodiment implementing the invention. For example, if possession-based factors are utilized, a token is required, as well as a token reader. An exemplary token includes memory and processing capability, as well as an inherent passive RF signature formed by randomly shaped, sized, and placed pieces of metallic matter embedded in the substrate of the token itself. Signatures of this type, present on tokens, are also disclosed in U.S. Pat. No. 6,229,445.

Also, if biometric-based data is utilized, a biometric reader for capturing the particular data (for example, fingerprint reading, retinal scan, voice characteristic) must be used (for example, fingerprint reader, retinal scanner, microphone, respectively). Also, any necessary hardware or software for converting the raw biometric data to usable digital data must be present.

Much of the processing of data performed to implement the process of the present invention is done on a token, when possession-based factors are utilized. However, other functions, for example, the biometric verification, take place off the token. Also, if possession-based factors are not part of the particular identification and authentication embodiment used under the present invention, other functionality necessarily must be performed other than on a token. As is well known to those of skill in the art, these functions can be performed by a computer, or any other device having sufficient processing capability, such as a personal data assistant or a telephone. Further, the instructions utilized to cause the processing device to perform the necessary functionality can be stored on any computer-readable medium, such that the instructions are provided to the processing device at such time as any of the various embodiments of the process of the present invention are to be performed.

Generally, according to the present invention, a computer system includes a user profile for each user of the system. A user profile is used to determine whether and how the user can encrypt (write) and decrypt (access) an object, which can be, for example, a data instance or a computer program.

A user profile includes at least one credential, and each credential includes one or both of an asymmetric key pair: a credential public key (write authority), and a credential private key (access authority). The use of a particular credential can be write-only, access-only, or write and access authorized.

A user can write (or secure) a preexisting object, which might be unsecured or already secured, or a new object created by the user, such as an electronic communication. A user secures an object by accessing at least one credential included in the user's user profile, and encrypting the object with the respective public key of each of the at least one accessed credential, such that subsequent access to the secured object requires access to corresponding or otherwise authorized credentials.

A user can access a secured object if the user possesses credentials corresponding to those with which the secured object was encrypted.

A credential or an object can have a respective MLA level associated with it. A user can secure an object at one or more respective access levels with one or more accessed credentials, such that subsequent access to the secured object requires access to corresponding or qualified credentials. Access levels can correspond to a partitioned access scheme, an access up scheme, or an access up scheme in regards to encryption and decryption. Different schemes can be selected for write and read control.

A user can control the access level available to the user by selecting one or more of the user's credentials either at the time an object is to be encrypted or decrypted, or during implementation of an identification protocol through which the user obtains access to the computer system.

A user profile and one or more credentials contained in the user profile can be secured, in whole or in part, through one or more levels of encryption. Thus, a user can obtain access to the user's respective user profile and one or more particular credentials included in the profile by providing the requisite data for respective decryption of the profile or the credentials. The requisite data can be encryption scheme data (such as one or more encryption keys, algorithm identifiers, key qualifiers, or algorithm qualifiers) or instances of keying data used to generate encryption scheme data. Further, a user can provide the requisite data as required or during an identification protocol implementation through which the user obtains access to the computer system. In either case, the requisite data can be preexisting or generated, in whole or in part, such as through a combining or binding procedure.

In constructing an object encryption key (or session key), the paradigm of the present invention includes a random value. The random value is encrypted using the public part of an asymmetric key pair. To reconstruct the object encryption key, the random value must first be decrypted using the corresponding private part of the asymmetric key pair. Enforcement through read and write access control is based on sharing the private and public keys, respectively. The key pairs are directly correlated to credentials that are associated with labels or information content. By using more than one key pair to encrypt and decrypt the random value, access can be restricted or broadened.

Asymmetric Key Credentials

A credential is a key pair used for access control. The public key is called the write credential and the private key the read credential.

A credential or set of credentials can define a role. In the system of the present invention, domain members can be assigned to one or more roles and have access rights that correspond to the credentials within that role. Applying a credential during encryption under this system can be referred to as labeling.

The application of the scheme of the present invention is embodied in the labeling of an object. When a credential is applied, the public key associated with that credential is used in the encryption process. The private key associated with that same credential must be available in order to be able to decrypt the object. Possession of public and private keys is the basis of read and write access control in the system of the present invention.

Credentials that Restrict Access

A single credential can be used during a session, and simultaneous use of more than one credential is also allowed. A user is required to have read access to all of the credentials that were used for session encryption before decryption is possible. This means that adding credentials during encryption has the effect of restricting readership within the domain.

Credentials can be grouped into categories for ease of use. Generally, within a category, credentials will be related. An example of a category is "country". Credentials in this category might include "U.S.", "Canada", "Germany", "England", and so on. Selecting "U.S." from the country category as a credential during encryption would limit readership of the encrypted object to those who have read access to the "U.S." credential. Another example of a category is "security level". Credentials found in this category could be "Top Secret", "Secret", "Confidential", or "Sensitive But Unclassified". Thus, selecting "Secret" from the security level category as a credential during encryption would limit readership of the encrypted object to those who have read access to the "Secret" credential.

Given that credentials within a category are related, applying multiple credentials by selecting one credential from each category during encryption is contemplated. For example, selecting "Secret" from the security level category, and "U.S." from the country category would limit readership even more as only those who have both the "U.S." and the "Secret" credential could decrypt the object. This is an example of adding credentials that restrict readership.

Note that credentials within a category can be mutually exclusive, as for example, the country category above where each credential can be taken without reference to a role or member's association. However, credentials can also be inclusive, such as those in the security level category, in which it can be defined that credentials to a particular security level can include credentials to all security levels lower than that level. The partitioning of the "Top Secret", "Secret", and "Confidential" read and write access would depend on assigning these credentials to identified roles that are associated with the members.

Credentials that Broaden Access

The system architecture gains more flexibility if credentials are allowed to broaden readership in addition to restricting readership. Broadening access can be managed by allowing multiple credentials within a particular category to be chosen. In this case, a member would be required to have read access for only one of the credentials that were used for encryption within that category. This is known as "either-or" capability, because either of the credentials is required for decryption.

Referring back to the previous example, choosing both the "Canada" and the "U.S." credentials from within the country category will allow users with either read access for "Canada" or read access for "U.S.", the ability to decrypt. Adding credentials by selecting more than one credential within a category broadens readership.

There is a danger that for categories that have inclusive type credentials, it is possible for a member to misuse this access broadening mechanism. For example, it defeats the purpose to label data as both "Top Secret" and "Confidential". In this case, credentials should be bound to the I&A process to differentiate a member's access rights.

Credentials that Have Different Sensitivity

Different user identification factors can be used alone or together according to the present invention to create different I&A schemes, such as that defined in the co-pending I&A patent application cited previously. More than one scheme can be defined within a domain. Security levels, risk assessment levels, or assurance levels may be related to different schemes. These schemes are assigned a Multi-Level Access (MLA) level. A domain member can have a choice of which I&A scheme to use for login depending on the assigned relative security level.

Credentials are assigned to an MLA level. Whether the use of a particular credential is permitted depends on the MLA level of the I&A scheme that was used for login.

For a login of a given security level, three possibilities exist for read access and for write access—only those credentials at the same level as the login are accessible, those at the same level and up are accessible, or those at the same level and down are accessible. The first type of access is called partitioned access, the second type access up, and the last access down. Combinations of all access types result in nine different ways to handle multi-level read and write access. The choice of access type will depend on the domain environment and domain policy.

In FIG. 7, the symbol, -, represents permission to use credentials only at the same level as I&A, ↑ represents permission to use credentials at the same level as I&A or above, and ↓ represents permission to use credentials at the same level as I&A or below.

As an illustration, consider the Bell-LaPadula model, which is used within the military environment. This corresponds to combination 8 in FIG. 7 and can be summarized as "read-down/write-up". Translated for the present invention, this means that credentials at or above the current login level can be used for encryption, and data that has been encrypted with credentials at or below the current login level can be decrypted. Using the examples from above, logging in at the lowest level would enable the member to encrypt using all of the credentials in the security level category for encryption. However, only data encrypted using credentials at the lowest level, say "Confidential", can be decrypted. Logging in at the highest level would enable the member to encrypt data using "Top Secret" only, but would allow decryption of data that used any of the credentials within the security level category.

A domain can selectively apply an MLA level to a category. In the previous example, MLA was applied to the "security level" category, whereas the "country" category was not subject to MLA.

Access Control through Symmetric Key Algorithms

The symmetric key cryptographic algorithms that are used for object encryption can be used to control access. The ability of a member to use a specific algorithm can be allocated to roles as another factor enforcing access control. The selection of algorithms can be defined by the domain.

For example, members who are in the U.S. might have all algorithms including AES with all key sizes while those in England might have 128-bit AES or use a proprietary algorithm. Other countries might use DES, while others might use 40-bit RC2. The selection of available algorithms can be defined through national policy.

The symmetric algorithm access process can be complemented with MLA. The algorithms available to a member would also then depend on the security level of the member login process. The combination of algorithm access and MLA offers a more balanced security approach. Data that is more sensitive requires stronger algorithms together with stronger user I&A.

Access to Applications

Access to applications and associated credentials can also be controlled. Each application, along with the list of credentials that are valid for each application, is assigned to a member. The application credentials will be contained in the member's profile that is defined, for example, through the runtime environment of the key management system. Only the credentials that appear in the list can be used with the application. The I&A process validates a member to his or her profile for further decryption of the profile. After the profile is decrypted, the application-credentials are available for accessing prescribed applications. The key management runtime environment protocol, for example, enforces the access to an application.

Additional integrity can be included in the application-credential process. The application's file (or an element of the file) and the list of associated credentials can be digitally signed by the domain authority. To access an application, a member must have the digital signature in his or her profile, as well as at least one of the credentials associated with the application. When the application starts, the key management runtime environment requests the signature from the member's profile. If there is no signature, the application is not accessed. If the signature is available, it will be verified against the application file and the list of credentials associated with that application. If the signature verifies correctly, access is granted. The runtime environment will only allow the member to use the set of credentials that the domain authority has associated with the application.

Implementation

Credentials Available

Different I&A methods correspond to different MLA levels depending on the domain policy. The result of a successful login is a value that is used as a symmetric cryptographic key.

Each credential has an MLA level associated with it. When MLA is used, then the credentials that are available will depend on the level of the I&A scheme used to login. MLA levels are represented by the number 0, and by integers starting from 1. A credential assigned to level 0 is special; this signifies that the credential is exempt from MLA. Beginning with level 1, higher levels can represent different levels of security, for example, stronger security. MLA exemption will be in effect for all credentials within a given category, that is, individual credentials, while flagged with level 0, are not individually given MLA exemption—only categories are. Those credentials in the categories that are exempt from MLA (as determined by the domain authority) are always available.

For credentials in categories that are subject to MLA, access is granted if the credential MLA level corresponds to the I&A level. This is true whether partitioned access, access up, or access down is specified.

For encryption, if write-up is specified by the domain authority, then the public keys for all credentials with MLA level greater than the I&A level will also be available. If write-down is specified, then the public keys for levels below the I&A level will be available for encryption.

Similarly for decryption, if read-up is specified, then private keys for credentials with MLA level greater than the I&A level will be available. If read-down is specified, then private keys for credentials with MLA level below the I&A level will be available.

Profile Encryption

Encryption of credentials within a member's profile is the basis for enforcing multiple-level access. Credential private and public keys are encrypted with a key corresponding to the MLA level assigned to the credential. These credential encryption keys (CEKs)—the credential private key encryption keys and credential public key encryption keys—appear in the profile as ciphertext. The encryption key for each CEK is derived from the I&A value of the corresponding level.

Any suitable proprietary or standard symmetric key algorithm can be used for profile encryption. For example, triple DES (3×DES) is a current standard symmetric key algorithm suitable for profile encryption. A replacement algorithm for 3×DES known as the Advanced Encryption Algorithm (AES) will soon be an official standard. AES in eight bit cipher feedback (CFB8) mode can be used to encrypt the member's profile. The profile encryption key (PEK) is 128 bits for the key plus 128 bits for an initialization vector (IV), for a total of 256 bits. The IV used for the profile is a random string that is stored as plaintext within the profile. The key portion of the PEK is encrypted using the I&A derived value as the basis for the profile key encryption key (PKEK). If more than one level of I&A is used, such as with MLA, then there will be more than one PKEK. CFB8 mode is presented as an exemplary key algorithm, so that each item in the profile can be encrypted without regard for padding issues.

To implement read-up or read-down, the credential private key encryption keys are related to each other. Similarly, to implement write-up or write-down, the credential public key encryption keys are related to each other. The relationships are defined below. There four types of credential access: MLA exempt credential access, partitioned access, access up, and access down.

MLA Exempt Credentials: If the credential is exempt from MLA, then the credential encrypting keys and initialization vector are the same as the profile encrypting key and IV.

Partitioned Access: For partitioned access, the credential encrypting key is just the value derived from the I&A process of the corresponding level.

Access Up: For access up, the credential encryption key for the lowest level is generated at random. Credential encryption keys at other levels are derived from this first key in such a way that key values of levels above any level can be derived but key values of the levels below cannot. For example, a one-way hash function (OWHF) such as SHA256 is used.

Access Down: For access down, the credential encryption key for the highest level is generated. Credential encryption keys at lower levels are derived from this key in such a way that key values of levels below some given level can be derived but key values of levels above cannot. For example, a OWHF such as SHA256 is used.

Random Value Encryption Key Generation

There are two random values associated with the key management process of the present invention: a random value that is used in the construction of a working key, and an ephemeral key pair that is used in the encryption and decryption of the first random value.

A combiner, or binder, is the function that produces a working key, that is, the key used for object encryption, as described previously. The combiner takes three key inputs: a domain value, a domain maintenance value, and a random value. Domain and maintenance values are included in a member's profile but the random value must be sent or kept with the encrypted object. The random value changes with the creation of a new working key. Credentials that are chosen for use in the encryption process are used to encrypt this random value. The encryption of the random value with a key derived from the chosen credentials is the basis of assigning access permissions and enforcing access control to encrypted objects.

Each instance of an object encryption results in a new random value and Diffie-Hellmen ephemeral key pair generation. For encryption, the ephemeral private key is used with each chosen credential public key to compute shared values. The ephemeral public key is sent with the encrypted object for use during decryption. For decryption, the ephemeral public key will be used with each credential private key to recreate the shared values. From these shared values, a random value encryption key (REK) is calculated.

Restricting Access Credentials

To use credentials that only restrict access, the REK is built from all of the shared values. This requires possession of all of the credential private keys (read permissions) in a member's profile for decryption. To manage this effectively, credentials are partitioned into categories and the user interface will only allow one credential to be chosen per category.

Figure 8:
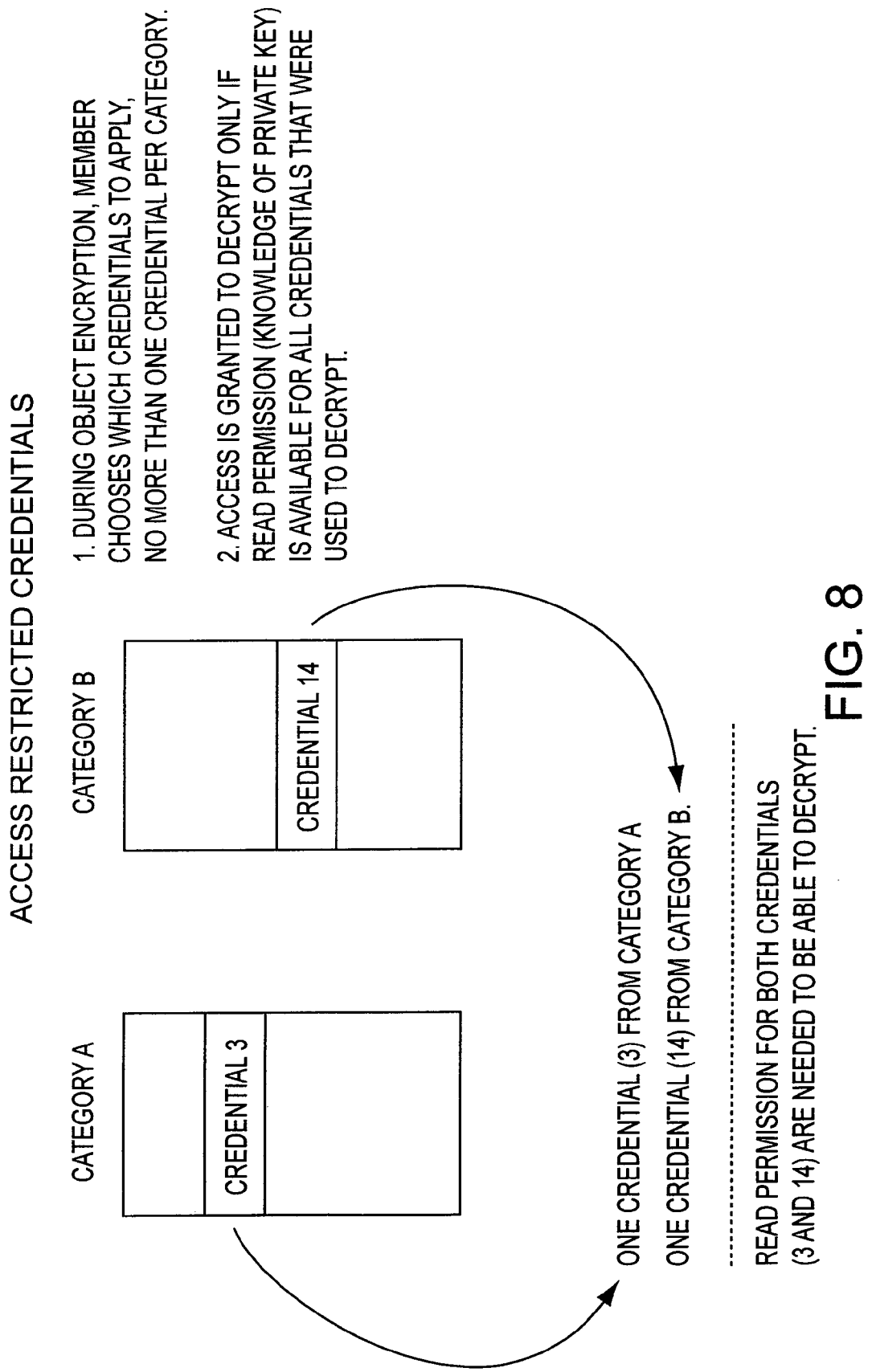
FIG. 8 is a block diagram illustrating the selection of credentials, to restrict access according to an exemplary embodiment of the present invention.

The REK is produced from the shared values by binding using, for example, the combiner noted above, to generate a key from shared values. AES in ECB mode can be used, for example, to encrypt the random value, in which case 128 bits of key are needed. Using this exemplary algorithm would mean that the basic method of generating the REK is to concatenate the shared values, a counter value, which is the string value $00000001_{16}$, and some "other" information, which in this case can be the credential indices, concatenated in order. This value is then hashed using SHA256 and the most significant 128 bits from this hashed value is used for the REK. See FIG. 8.

As shown in the figure, during object encryption, a member chooses which credentials to apply. In this example, no more than one credential per category can be chosen. As shown, Credential 3 is selected from Category A, and Credential 14 is selected from Category B. Thus, read permissions for both credentials are required to be able to decrypt the encrypted object. That is, access is granted to decrypt only if read permission (knowledge of private keys) is available for all credentials that were used to encrypt.

Broadening Access Credentials

Figure 9:
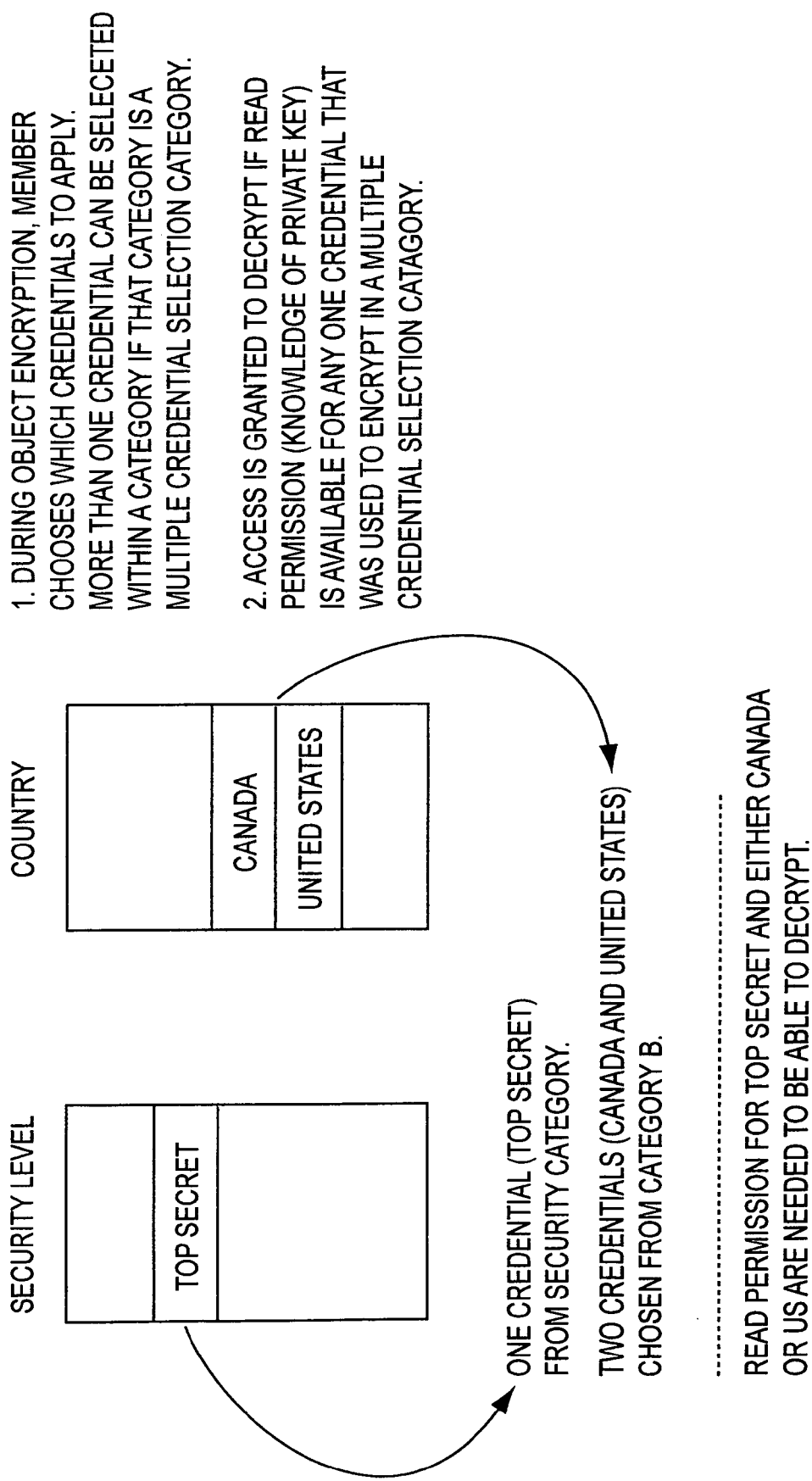
FIG. 9 is a block diagram illustrating the selection of credentials to broaden access according to an exemplary embodiment of the present invention.

For credentials that broaden access, a different implementation is used. The user interface will allow multiple credentials within a category to be selected. This is interpreted as the requirement to have read access to at least one of the chosen credentials in each category to enable decryption. A category for which this applies is called a multiple credential selection category (MCSC). See FIG. 9.

As shown in the figure, during object encryption, a member selects which credentials to apply. More than one credential can be selected form within a category if that category is a MCSC. In the example shown, one credential (Top Secret) is selected from the Security Level category, and two credentials (Canada and United States) are selected from the Country category. Thus, read permissions for Top Secret and either Canada or United States are required to be able to decrypt the object. That is, access is granted to decrypt if read permission (knowledge of private key) is available for any one credential that was used to encrypt in a MCSC, as well as read permission for a credential form any other category.

One solution is to encrypt the random value multiple times with multiple keys. In general, there is a key for each combination of credentials. Let $s_1$ be the number of credentials chosen for the first MCSC, $s_2$ for the second, and so on. Then, for n MCSC categories there are $m_L$ REKs, where $m_L$ is the product of all the $s_i$, that is, $$m_L = \Pi_{i=1}^{n} s_i$$

Each REK then would be the product of n shared values, that is, one shared value per category. This also implies that $m_L$ encryptions of the random value will be performed with $m_L$ different keys and $m_L$ times as much space will be required for the encrypted random value to be kept with the encrypted object in the header. This solution is called the lockbox method.

However, another solution based upon using a (2, $s_i$+1) threshold scheme will, in some cases, involve less data to store than the multiple REKs of the lockbox method. This method is called the threshold method. Using the Shamir Threshold Scheme, a threshold key is generated and $s_i$+1 threshold shares are created for MCSC i. The key set used can be any sufficiently large prime number. The domain-wide Diffie-Hellman parameter $p_c$, for example, can be used for the key set.

From the Diffie-Hellman shared value calculated for each credential within a MCSC, an AES key is calculated by binding as described above, using a counter of $00000001_{16}$ and the credential index as "other" information. These $s_i$ derived keys are used to encrypt $s_i$ of the threshold shares with AES. These are done in order, that is, the derived key corresponding to the lowest index credential is used to encrypt the second share. The first share remains plaintext.

The threshold key for each category is used like a shared value in the computation of the REK. The combiner method is again used, but with the threshold keys for the MCSC categories instead of Diffie-Hellman shared values and "other" information constructed from the number of credentials selected from each MCSC category.

Figure 10:
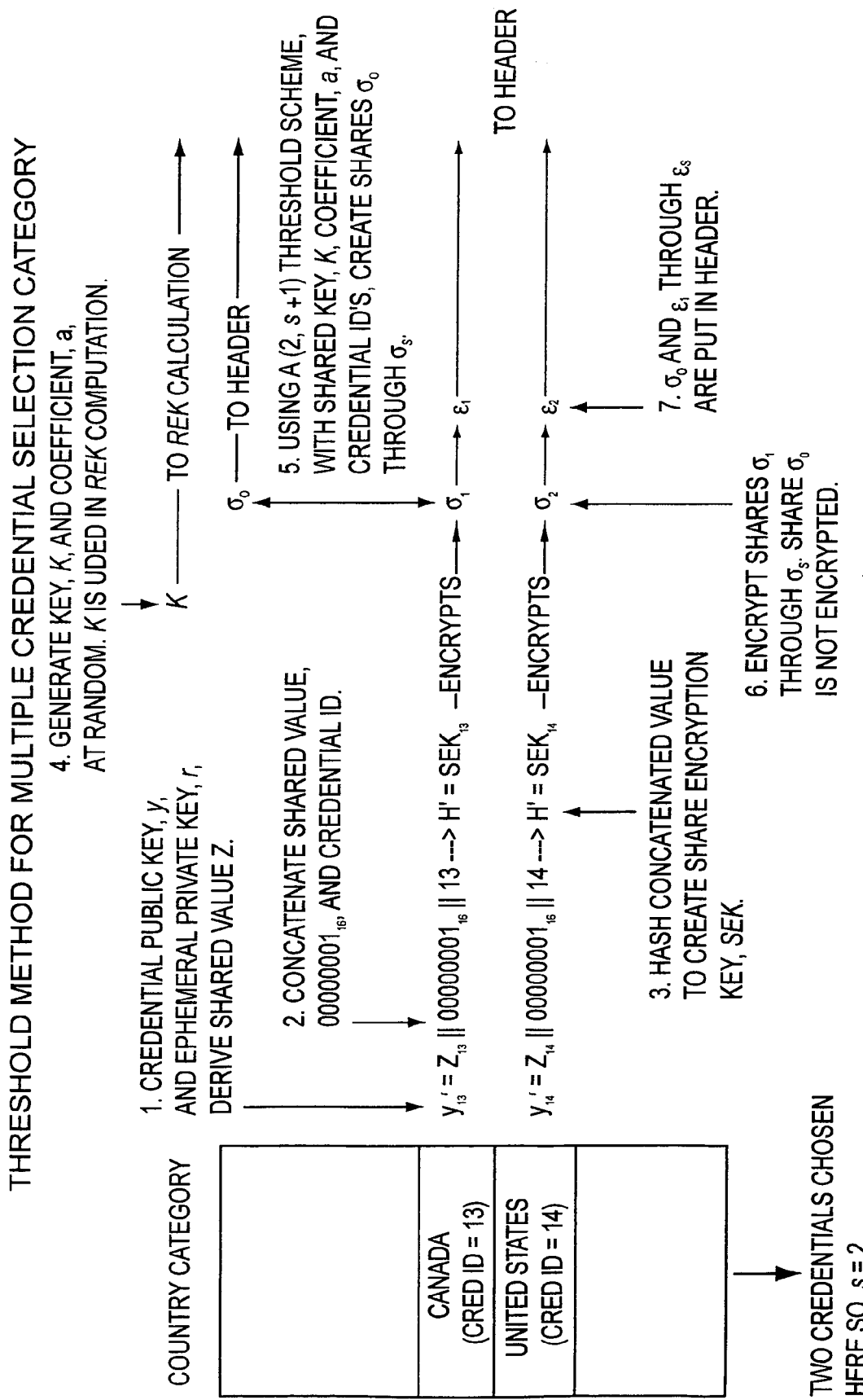
FIG. 10 is an illustration of the threshold method of implementing multiple credential selection categories.

FIG. 10 gives an overview of an exemplary threshold method of implementing multiple credential selection categories. The MCSC category is "Country" and two credentials have been selected, that is, "Canada" and "United States" which in this example have credential IDs of 13 and 14.

The information included with the encrypted object will include one encrypted random value, a plaintext threshold share per category, and a total of $\Sigma_{i=1}^{n} s_i$ encrypted threshold shares. If the number of items to be included with the encrypted object is denoted as $m_T$, then $$m_T = 1 + n + \Sigma_{i=1}^{n} s_i$$

If one category is used with multiple credentials, then the threshold scheme will produce two more items in the header, compared to the lockbox method. However, if more than one category has multiple credentials and more than three credentials are chosen within these categories, the threshold method will produce fewer items. The more credentials within each category that are chosen, the better the threshold scheme is, in terms of space resources, over the general product method.

Another method of implementing access-broadening credentials is to generate a 128-bit random value per category. These values are called $REK_i$, where the index i represents the category with which it is associated. The random value is only encrypted once with the REK. The REK is calculated as the exclusive-OR value of all the $REK_i$.

For each credential chosen within a category, the $REK_i$ is encrypted. The credential public key and ephemeral private key are used to derive a shared value as the basis of the encryption key. The key derivation function of the binder as discussed previously can be used to calculate the encryption keys.

The extra information to be included with the encrypted object is simply n 128-bit encrypted values, where the value n is just the total number of credentials chosen.

Details

| | Symbols |
|---|---|
| $e(x, y)$ | AES encryption (in ECB mode) of x using y as the key. The values, x and y, are 128 bits. |
| $e(x, y, z)$ | AES encryption (in CFB8 mode) of x using y as the key and z as the IV. All values are 128 bits. |
| $d(x, y)$ | AES decryption (in ECB mode, 128 bit key) of x using y as the key. |
| $d(x, y, z)$ | AES decryption (in CFB8 mode, 128 bit key and IV) of x using y as the key and z as the IV. |
| $\oplus$ | Exclusive-OR operation. |
| $\oplus_{i=1}^{n} x_i$ | Exclusive-OR all values of $x_i$ together from i = 1 to n. |
| $\|_{i \in S} x_i$ | Concatenate the $x_i$ values together for all i in the set S. |
| $H^y(x)$ | Cryptographic hash of x, applied y times |
| $H'(x, n, o)$ | The combiner method of generating a key from shared value x using counters up to n and other information o. |

-continued

Symbols

| | |
|---|---|
| $\kappa_\lambda$ | The key derived from I&A events specified for MLA level $\lambda$. |
| $\lambda_{max}$ | Represents the maximum MLA level. |
| $\lambda(c)$ | Represents the MLA level of credential c. |
| P | Represents data stored in a member's profile. |
| A | Represents the set of credentials available to a member at a given time. |
| S | Represents the set of credentials chosen by the member for encryption. |
| $C_{max}$ | The maximum number of credentials within a domain. Typically this is $2^8$ (256) or $2^{16}$ (65,536). |
| $p_c, q_c, g_c$ | Combiner Diffie-Hellman parameters. |
| $X_i$ | Private key associated with credential i. |
| $Y_i$ | Public key associated with credential i. |
| $Z_i$ | Computed shared value for credential i, (uses ephemeral keys). |
| r | Ephemeral private key. |
| t | Ephemeral public key. |
| $K_i$ | Threshold key for category i. |

Mathematical Description

Credentials Available

If MLA is not used, the set of credentials available to a member are all credentials that appear in the member's profile, that is, $\forall c \in P$.

In general, a credential is represented by an 5-tuple, (cid, $d_c$, $x_c$, $y_c$, $\lambda_c$), where cid is the credential index, $d_c$ is the category, $x_c$ is the private key for the credential, $y_c$ is the public key for the credential and $\lambda_c$ is the MLA level defined for the credential by the domain authority. Note that within a profile, the private key can be missing for some credentials. This implies encrypt-only (or write-only) permission for that credential.

Credentials that are in categories that are exempt from MLA (as determined by the domain authority) are always available. This set of credentials is $$\{\forall c \in P | \lambda_c = 0\} \quad (1)$$

The table shown in FIG. 11 summarizes the set of credentials that are available to a member who has logged in using an MLA level of $\lambda_{IA}$. The access type corresponds to the combinations from the table in FIG. 7.

The set described in eq. (1) in union with the one of the sets above (which depends upon domain policy) will be represented as $\forall c \in A$, where A is the set of available credentials per login.

Encryption of Member's Profile

Encryption of Profile Data Excluding Credentials

The profile is encrypted with a profile encryption key, PEK and an initialization vector, PIV. The PIV is stored in the profile in plaintext form. The PEK is encrypted $\lambda_{max}$ times, where $\lambda_{max}$ is the number of MLA levels used. The term $ePEK_\lambda$ represents the encrypted value of the PEK for MLA level $\lambda$ as stored in the profile, $$ePEK_\lambda = e(PEK, \kappa_\lambda, PIV) \quad (2)$$

where $\kappa_\lambda$ is the key derived from all I&A events that are defined for MLA level $\lambda$.

For decryption, a member completes a successful login at MLA level $\lambda$, regenerating the key $\kappa_\lambda$, and then recovering the PEK from $ePEK_\lambda$, which will allow decryption of the rest of the profile.

$$PEK = d(ePEK_\lambda, \kappa_\lambda, PIV) \quad (3)$$

Encrypting Credentials in the Member's Profile

Public and private keys are encrypted in the profile. The 5-tuple corresponding to credential c is stored in the profile as (cid, $d_c$, $ex_c$, $ey_c$, $\lambda_c$), where $$ex_c = e(x_c, xek_c, XIV_c) \quad (4a)$$

$$ey_c = e(y_c, yek_c, YIV_c) \quad (4b)$$

are the encrypted credential private and public keys. The $xek_c$ and $yek_c$ are credential private and public key encrypting keys, and $XIV_c$ and $YIV_c$ are private key and public key initialization vectors, respectively.

MLA Exempt Credentials

If the credential is exempt from MLA, then the credential encrypting keys and initialization vector are the same as the profile encrypting key and IV.

$$\forall c \in P \ni \lambda_c = 0$$

$$xek_c = yek_c = PEK \quad (5a)$$

$$XIV_c = YIV_c = PIV \quad (5b)$$

MLA Subject Credentials

There will be $\lambda_{max}$ initialization vectors corresponding to each MLA level and represented as $PIV_\lambda$.

$$\forall c \in P \ni \lambda_c \neq 0, \text{ and } \forall \lambda \ni 1 \leq \lambda \leq \lambda_{max},$$

$$XIV_c = YIV_c = PIV_{\lambda c} \quad (6)$$

Each $PIV_\lambda$ is stored as plaintext in the profile.

Partitioned Access

For credential read or write partitioned access, the encrypting key is just the value derived from the I&A process. For read partitioned access, $$xek_c = \kappa_{\lambda c} \quad (7a)$$

For write partitioned access, $$yek_c = \kappa_{\lambda c} \quad (7b)$$

Access Up and Down

There will be $\lambda_{max}$ credential private key encryption keys, and $\lambda_{max}$ credential public key encrypting keys. These keys are represented by $xek_\lambda$, and $yek_\lambda$ respectively, where $\lambda$ corresponds to an MLA level. Each $xek_\lambda$ and $yek_\lambda$ are stored encrypted in the profile using the value derived from the I&A process for the respective level as the key.

For $1 \leq \lambda \leq \lambda_{max}$ $$exek_\lambda = e(xek_\lambda, \kappa_\lambda, PIV) \quad (8a)$$

$$eyek_\lambda = e(yek_\lambda, \kappa_\lambda, PIV) \quad (8b)$$

and to recover the $xek_\lambda$ and $yek_\lambda$ $$xek_\lambda = d(exek_\lambda, \kappa_\lambda, PIV) \quad (9a)$$

$$yek_\lambda = d(eyek_\lambda, \kappa_\lambda, PIV) \quad (9b)$$

For read-up or down access, the credential private key encryption keys are $$xek_c = xek_{\lambda,c} \quad (10a)$$

For write-up or down access, the credential public key encryption keys are $$yek_c = yek_{\lambda,c} \quad (10b)$$

For access up, an encrypting key for I&A level 1 is generated at random. All access up type encryption keys are derived from this value. The encrypting keys for I&A level other than the one used for I&A can then be derived from the encrypting key for level $\lambda_{IA}$.

For read-up $$xek_c = (H^{(\lambda,c - \lambda,IA)} xek_{\lambda,IA})/2^{(h-k)} \quad (11a)$$

For write-up $$yek_c = (H^{(\lambda,c - \lambda,IA)} yek_{\lambda,IA})/2^{(h-k)} \quad (11b)$$

where h is the output size of the hash function and k is the keysize of the credential encryption algorithm, in bits. The meaning of division by $2^{(h-k)}$ is that the derived key value is taken as the most significant k bits of the hashed value. For two-key triple DES and the SHA1 hash function (h−k) is 48. For AES (128-bit key) and SHA256 (256-bit output) this value is 128. For AES (256-bit key) and SHA256 (256-bit output) this value is 0.

Note that for read-up or write-up credentials, if $\lambda_{IA} > \lambda_c$, access to the credential c read or write value is denied.

For access down, an encrypting key for I&A level $\lambda_{max}$ is generated at random. The encrypting keys for I&A level other than $\lambda_{max}$ are derived from the encrypting key for level $\lambda_{max}$. All access down type encryption keys are derived from this value. The encrypting keys for I&A level other than the one used for I&A can then be derived from the encrypting key for level $\lambda_{IA}$.

For read-up $$xek_c = (H^{(\lambda,IA - \lambda,c)} (xek_{\lambda,IA}))/2^{(h-k)} \quad (12a)$$

For write-up $$yek_c = H^{(\lambda,IA - \lambda,c)} (yek_{\lambda,IA})/2^{(h-k)} \quad (12b)$$

For read-down or write-down credentials, if $\lambda_c > \lambda_{IA}$, access to the credential c read or write value is denied.

The table shown in FIG. 12 summarizes, for each access type as defined in the table of FIG. 7, the credential encryption keys and the independent values from which these are derived.

FIG. 13 shows encrypted parts of the member profile. Credential public and private keys are encrypted with credential public and private key encryption keys of the same MLA level as the credential. Public and private key encryption keys are encrypted with the I&A derived key of the same level. The rest of the encrypted profile is encrypted with the PEK. The PEK is encrypted once for each MLA level using the I&A derived key of each level.

Figure 14:
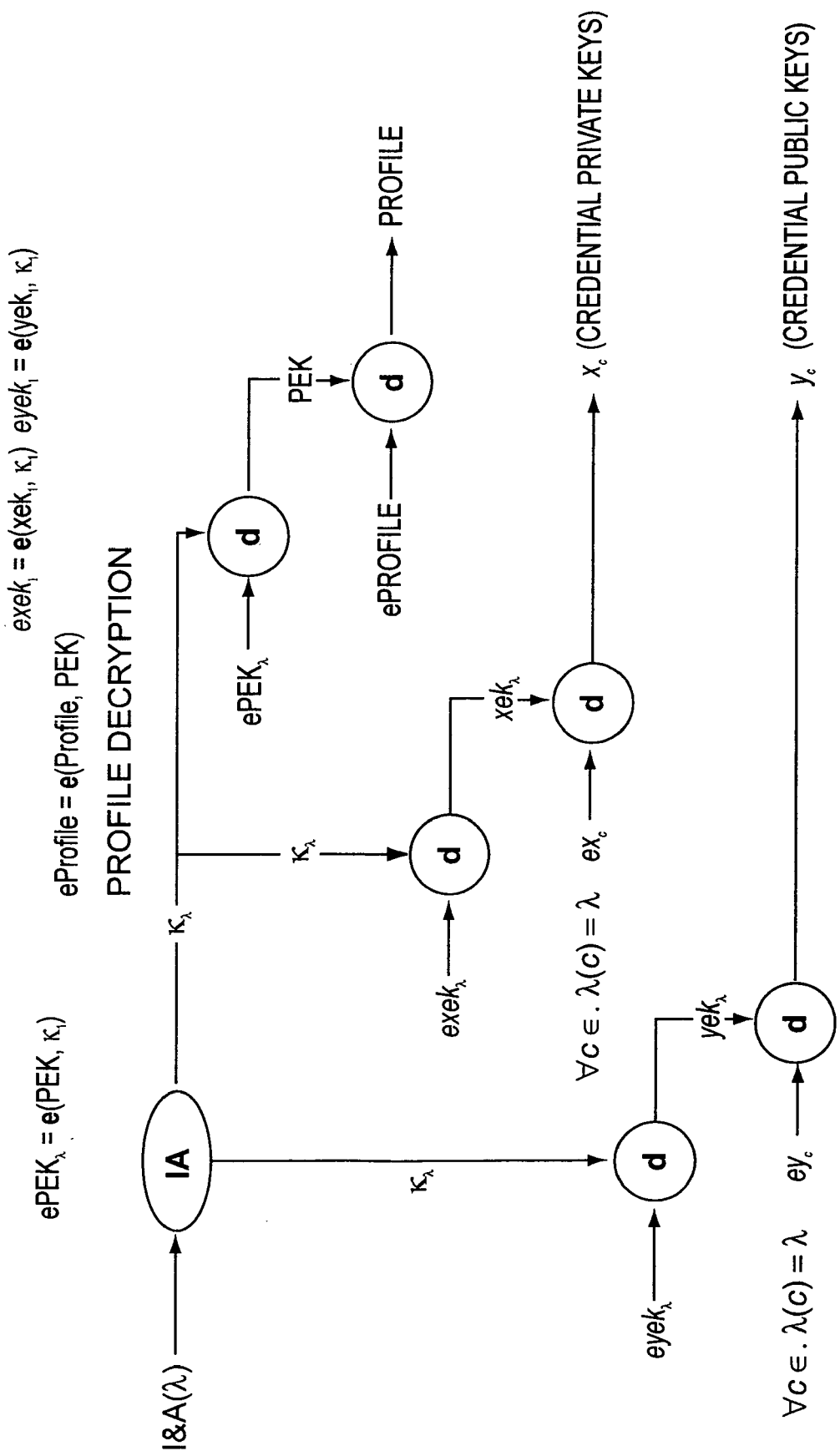
FIG. 14 is a block diagram showing steps in decrypting a member profile.
Figure 15:
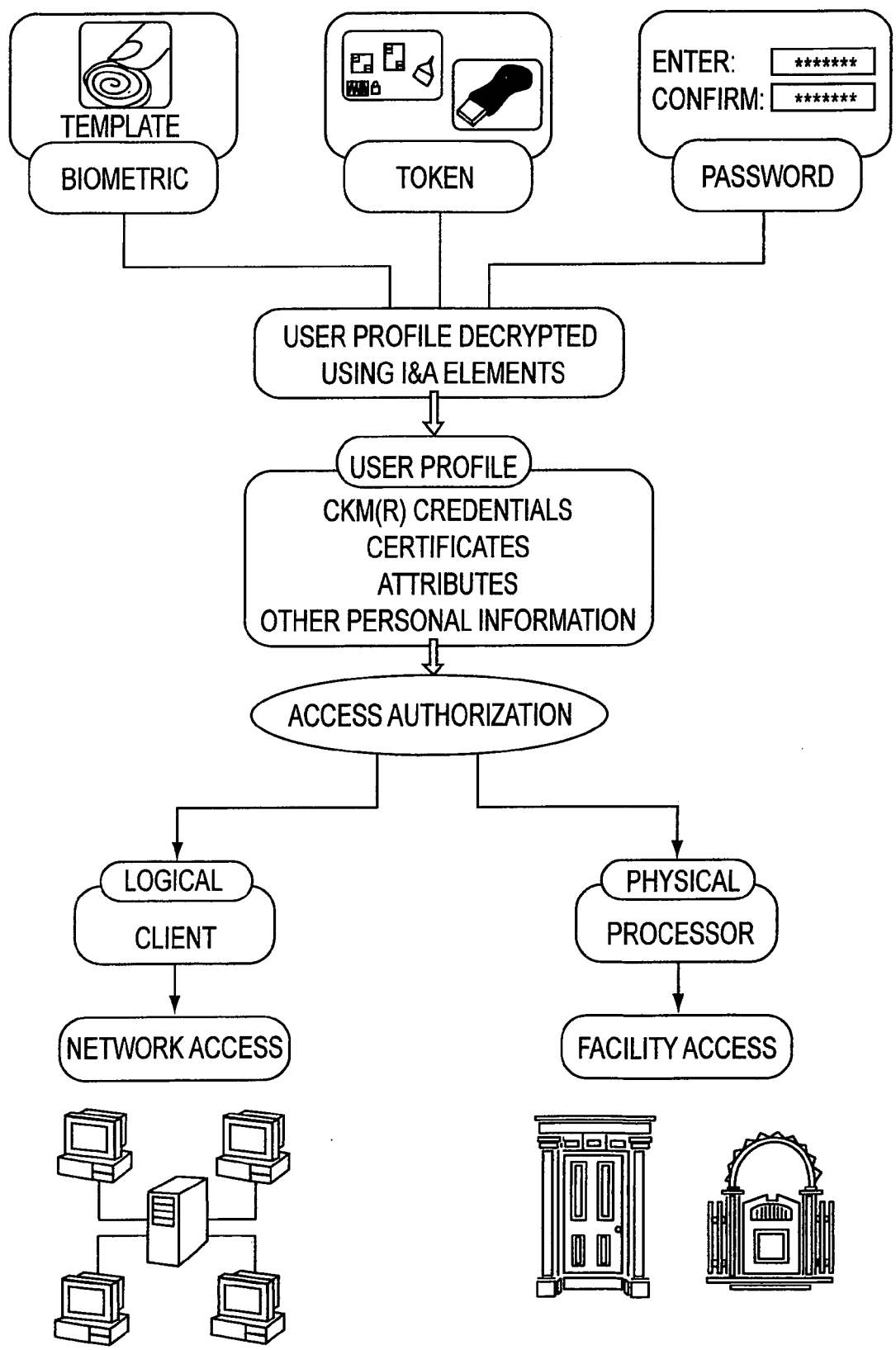
FIG. 15 is a functional diagram of an exemplary multiple-factor identification system.

FIG. 14 shows the process of decrypting the profile. The member logs on using an I&A process that corresponds to MLA level I. This level can be chosen by the member before logging in, can be dictated by the MLA level of an encrypted object, or can be specified for an application by the domain authority. A key is derived from the I&A events. This key decrypts the $ePEK_\lambda$ to recover the PEK, $exek_\lambda$ to recover $xek_\lambda$ and $eyek_\lambda$ to recover $yek_\lambda$. The profile is then decrypted with the PEK, credential private keys of MLA level $\lambda$ are decrypted with $xek_\lambda$, and credential public keys of MLA level $\lambda$ are decrypted with $yek_\lambda$.

Maintenance of Profile Keys

Periodically, cryptographic keys should be change. This applies to the I&A derived keys, profile encryption keys, and the credential public and private key encryption keys. Strategies to deal with key changes are discussed below.

I&A Derived Keys

An I&A event at one level is independent of I&A at other levels. Therefore, $\kappa_i$ can be changed easily without affecting any other $\kappa_j$ where i≠j. Simply decrypt the encrypted credential private and public key encryption keys, namely, $exek_\lambda$ and $eyek_\lambda$, with the old $\kappa_\lambda$ to recover xek and yek. Then generate a new $\kappa_\lambda$ and re-encrypt with this key to generate the new $exek_\lambda$ and $eyek_\lambda$.

Profile Encryption Key and Initialization Vector

The profile must first be decrypted, then a new PEK and PIV generated at random, and finally re-encryption of the profile with the new key and IV takes place. Then the new PEK must be re-encrypted with $\kappa_\lambda$, for each $\lambda$. However, only one $\kappa_\lambda$ is known during the session in which the PEK is being changed. To allow decryption of the PEK during the next session, which can be of a different I&A level, the new PEK is encrypted with the old PEK for each I&A level. This value is called ePEK'. After opening a session with a new I&A level, the encrypted PEK for the new I&A level can be calculated and stored. To simplify the process, a new PEK should not be generated until the previous PEK has been re-encrypted under all I&A levels. This leads to the following procedures.

Initial Change of PEK During a Session of I&A Level $\lambda$:

First, open a session with I&A level $\lambda$. Next, check to see if the old encrypted PEK, ePEK', is zero. If it is zero, then a new PEK can be generated. If it is not zero, then stop the PEK update process and go to the next action. Generate a new PEK and re-encrypt the entire profile with this new PEK. If the new randomly-generated PEK is zero, then choose a new PEK. Next, encrypt the old PEK under the new PEK and replace ePEK' with this value. Encrypt the PEK with $\kappa_\lambda$ as the key and replace the old $ePEK_\lambda$ with this new value. Then, initialize a Boolean change table (the PEK change table) to all zeros. Each entry in the PEK change table represents one I&A level. Next, set the value in the PEK change table of the entry corresponding to I&A level $\lambda$.

Subsequent Sessions of I&A Level i Where i≠$\lambda$:

First, open a session with I&A level i. Next, check the entry corresponding to I&A level i in PEK change table. If this entry is set, then check all entries to see if they are set. If all entries are set, then erase the old encrypted PEK, that is, set ePEK' to zero and continue as normal. If the entry is not set, then continue with the next action. Decrypt $ePEK_i$ with key $\kappa_i$ to recover the old PEK, and decrypt ePEK' with the old PEK as the key to recover the new PEK. Next, encrypt the PEK with $\kappa_i$ as the key and replace the old ePEKi with this new value. Then, set the value in the PEK change table of the entry corresponding to I&A level i.

Credential Public and Private Key Encryption Keys

Changing a credential key encryption key is more involved. Depending on access type, credential key encryption keys can have dependences on each other for different I&A levels. Therefore, it might not be possible to change just one credential key encryption key; the sequence of credential key encryption keys for all I&A levels might have to be changed all at once. However, if credential keys, either public or private, are partitioned or exempt from MLA, then one can proceed as above for the PEK.

For access down, only credential key encryption keys below the current I&A level can be accessed. Therefore, the session must be in the highest I&A level to allow changing of these credential key encryption keys. Similarly, for access up, the session must be in the lowest I&A level to change this type of credential key encryption keys.

Because only one $\kappa_\lambda$ is known during a session, knowing just the credential key encryption keys for all I&A levels will not suffice. A strategy similar to changing the PEK is needed. This is done by using the old credential key encryption key of the same I&A level to encrypt the new credential key encryption key. Since there are both private and public credential keys, two lists of old credential key encryption keys must be kept. If a zero is used in the list for a key corresponding to an I&A level that has already been changed, then a separate Boolean list such as the one above for the PEK change table does not have to be maintained.

In the following exemplary procedures, only one old credential key encryption key list is mentioned. This list represents either the public or private credential key encryption key lists or both. The term $CEK_\lambda$ represents any credential key encryption key—either public or private—of I&A level $\lambda$.

Initial Change of the Credential Key Encryption Key During a Session of I&A Level $\lambda$, where $\lambda$ is Either 1 for Access Up, or $\lambda_{max}$ for Access Down:

First, open a session with I&A level $\lambda$. $\lambda$ must be 1 for access up or $\lambda_{max}$ for access down. If not, then stop the CEK update process. Next, check to see if the old encrypted CEK for all I&A levels is zero. If they are zero, then the CEK can be updated. If the list is not zero, then stop the CEK update process. Next, generate a new $CEK_\lambda$ and generate CEK for all of the other I&A levels according to eqs. (11). Also, generate the old CEKs for all of the I&A levels. The old CEKs will be used later in the procedure. Then, re-encrypt the new $CEK\lambda_\lambda$ with $\kappa_\lambda$ as the key, and update this value in the profile. Also update the encrypted credential keys for level $\lambda$ by decrypting them with the old CEK and re-encrypting them with the new CEK. Then, store value zero in the old CEK list at the entry corresponding to I&A level $\lambda$. Then, for every i=2 through $\lambda_{max}$ (for access up), or for every i=$\lambda_{max}$-1 through 1 (for access down), encrypt the new CEKi with the old CEKi as the key, and copy the previous value to the old CEK list at the entry corresponding to I&A level i.

Subsequent Sessions of I&A Level i where i≠$\lambda$. where $\lambda$ is Either 1 for Access Up, or $\lambda_{max}$ for Access Down:

First, open a session with I&A level i. Next, decrypt eCEKi with $\kappa_\lambda$ as the key to recover CEKi. Then, check the entry corresponding to I&A level i in the old CEK list. That is, if the entry in the list is zero, then the CEKi from the previous step is the new CEKi. In this case, break from this procedure and continue normal processing. On the other hand, if the entry is not zero, then the CEKi from the previous step is the old CEKi. In this case, decrypt the entry with the old CEKi as the key to recover the new CEKi. Then store zero in the old CEK list at the entry corresponding to I&A level i. Next, encrypt the new CEKi with $\kappa_\lambda$ as the key and update the old CEKi value. Then decrypt all of the credential keys of I&A level i with the old CEKi, re-encrypt them with the new CEKi, and update the old value.

Computing a Random Value Encryption Key

Computing Shared Values

From the set of available credentials, A, the set of chosen credentials will be represented by $S \subseteq A$. A Diffie-Hellman ephemeral key pair is generated during object encryption. The shared value for each credential is then computed. For encryption, the $Z_i$ are calculated from credential public keys and the ephemeral private key, $$\forall i \in S\ Z_i = Y_i^r \bmod p_c \tag{13a}$$

For decryption, the $Z_i$ are calculated from credential private keys and the ephemeral public key, $$\forall i \in S\ Z_i = r^{x_i} \bmod p_c \tag{13b}$$

Computing the REK Using One Credential Per Category

Using one credential per category, the REK is calculated by $$REK = H'(T, 00000001_{16}, o) \tag{14}$$

where T is $$T = \|_{i \in S} Z_i \tag{15}$$

and the concatenation is performed in order of increasing i. The other information, o, is $$o = \|_{i \in S} cid_i \tag{16}$$

where (similar to above) the concatenation is performed in order of increasing c.

Computing the REK Using More than One Credential Per Category

Using more than one credential per category will result in several pieces of information to be sent or kept with the encrypted object in the header. The threshold method is described here for illustrative purposes; the lockbox method is not described in detail, but can be used instead. See FIG. 10 and the related description for an overview of the threshold method.

For each MCSC, represented as d, a shared key, $K_d < p_c$ and a coefficient, $a_d < p_c - 1$, are generated at random. Let the number of credentials chosen in category d be $s_d$. A total of $s_d + 1$ values will be generated and these values will be denoted as $x_{jd}$, where $0 \le j \le s_d$. The values are generated as follows:

$x_{0d} = c_{max} + 1$. The value $c_{max}$ is the maximum number of credentials that are possible in the system.

$x_{1d}$=the credential ID of the credential in category d with the lowest credential index.

$x_{2d}$=the credential ID of the credential in category d with the second-lowest credential index.

$x_{jd}$=the credential ID of the credential in category d with the $j^{th}$ lowest credential index.

Next, $s_d + 1$ shares, called $\sigma_{jd}$, where $0 \le j \le s_d$, are calculated:

$$0 \le j \le s_d\ \sigma_{jd} = (K_d + a_d x_{jd}) \bmod p_c \tag{17}$$

The share encrypting keys, $SEK_j$, are computed from the shared values, $Z_i$:

$$1 \leq j \leq s_d \quad SEK_j = H'(Z_i, 00000001_{16}, i) \tag{18}$$

where the i is the index of the credential that corresponds to the $j^{th}$ chosen credential in the category.

The shares are then encrypted using the SEKs and are put in the header. Let $\epsilon_j$ represent the encrypted share, then $$1 \leq j \leq s_d \quad \epsilon_j = e(\sigma_{jd}, SEK_j) \tag{19}$$

The first share, $\sigma_{0d}$, does not get encrypted; it appears in the header as plaintext.

The REK is calculated by $$REK = H'(T, 00000001_{16}, o) \tag{20}$$

where T is $$T = \|_{d \in S} K_d \tag{21}$$

and the concatenation is performed in order of increasing d. The other information, o, is formed by $$o = \|_{d \in S} d \tag{22}$$

where (similar to above) the concatenation is performed in order of increasing d. In a mixed situation, where some categories have multiple credentials selected and some have only one, the T value is formed from a mix of $K_d$ and $Z_i$ (in increasing order of category).

For decryption, the Diffie-Hellman shared values are first calculated. For multiple credentials in a category, only the first one that the member has read access for is needed. If the member has read access to none of the credentials used in an MCSC, then access to the encrypted object is denied.

Shared values are calculated from the private part of the credential key pairs and the public part of the ephemeral key pair, according to eq. (13b). Then the share encryption keys are calculated from the Diffie-Hellman shared values, according to eq. (18). The SEKs can then be used to decrypt the threshold shares:

$$1 \leq j \leq s_d \quad \sigma_{jd} = d(\epsilon_j, SEK_j) \tag{23}$$

The first threshold share, $\sigma_{0d}$, for a category is taken from the header, because it is plaintext. With the first threshold share and any other (decrypted) share within category d, the shared key, $K_d$, can be calculated.

$$1 \leq j \leq s_d \quad K_d = \sigma_{0d} - x_{0d}(\sigma_{0d} - \sigma_{jd})/(x_{0d} - x_{jd}) \bmod p_c \tag{24}$$

When all of the shared keys have been recovered, the REK is calculated according to eqs. (20) through (22), and the random component is then recovered. Once the random component is recovered, the working key can be reconstructed and the encrypted object can be decrypted.

The One Random Value per Category Method

For each MCSC, represented as i, 128 random bits are generated. These values will be referred to as $REK_i$. The random value encryption key, REK, is computed as the exclusive-OR result of all of the $REK_i$ $$REK = \oplus_1^d REK_i \tag{25}$$

Each $REK_i$ is encrypted with AES for each credential in the ith category before being transmitted with the encrypted object. The encrypted $REK_i$ for credential j is denoted $EREK_{ji}$, therefore, $$EREK_{ji} = e(REK_i, K_{ji}) \tag{26}$$

where $K_{ji}$ is the key associated with the jth chosen credential in category i. The $K_{ji}$ are computed by using the combiner key derivation function described previously, $$K_{ji} = H'(Z_{ji}, 00000001_{16}, j) \tag{27}$$

where $Z_{ji}$ is the Diffie-Hellman shared value corresponding to the jth credential in category i. These shared values are computed from the credential public keys, $Y_{ji}$, and the ephemeral private key, r.

$$\forall i \in S \forall d \quad Z_{ji} = Y_j^r \bmod p_c \tag{28a}$$

For decryption, the shared values are calculated from the credential private keys, $X_{ji}$, and the ephemeral public key, t:

$$\forall i \in S \forall d \quad Z_{ji} = t^{X_{ji}} \bmod p_c \tag{28b}$$

Fourth Exemplary Embodiment

In describing the fourth exemplary embodiment, certain terminology will be revisited. Any particular aspects of this description that might differ from the description set forth above is applicable only to this embodiment.

Identification Factors

There are currently three generally accepted factors that can be used to identify an individual. They are Biometrics (who they are), Tokens (what they have), and Passwords (what they know). However, further factors may be included to heighten the overall security of User identification, such as, for example, location data (where the User is), time data (when the User seeks identification), and others.

In most cases, the Total Cost of Ownership (TCO) increases as more factors are added. The TCO has been taken into account in the context of this paper.

The following sections discuss identification factors in more detail:

Biometrics

Biometrics is a technology that measures some physical characteristic of a person and compares the captured sample against the expected results. These expected results are known as a Biometric template. When the captured sample is compared to the template, a match percentage is normally computed. If the percentage is above a threshold amount, a "verification" is reported. Otherwise, the Biometric device reports a failure.

There are a number of different types of Biometrics that can be used: fingerprints, facial characteristics, hand geometry, a hand-written signature, voice, retinal, etc.

For Biometrics to work, there must be a way to create the Biometric template from captured samples. This template then needs to be stored for later comparison and verification. Ideally, this storage should be secured so that an attacker cannot tamper with the template.

When selecting a Biometric solution, several factors should be considered. First, a risk assessment must be performed to determine the acceptable level of rejection and acceptance rates. Different types of Biometrics have different rates of false acceptance and false rejection. Also, the Biometric device (that does the actual measurements) can influence the actual acceptance and rejection rates. The second factor is the life expectancy of the device. The recurring replacement cost of the device and the life expectancy enter the life cycle cost computations. The third factor is the cost of initial acquisition and deployment. This one-time cost also factors into the Total Cost of Ownership.

Tokens

A Token is a container of identity information. It can be a logical device, like a software Token, or a physical hardware device. Each basic type has different characteristics.

The software Token can be copied, and therefore only provides limited non-repudiation. It also allows attacks like a brute force Password attack where the attacker systematically tries the possible Passwords until the correct Password is found. The software Token is, however, the least expensive Token, and normally is also the most convenient Token.

Hardware Tokens come in many different varieties. Most hardware Tokens that would be used for cryptography include mechanisms to control access to data and can offer on-device cryptographic computation. Sometimes this computation ability is accomplished using additional hardware (for example, co-processor, accelerator, etc.).

One example of this type of hardware Token is the smart card. Smart cards have persistent storage capabilities to store the key material and identity information. They also have an operating system that controls the access to the information and functions that can use the information stored on the card. Smart cards do have limitations, however, in the amount of data they can store and the clock and Input/Output (I/O) speeds affecting access to the data and functions on the card. Most smart cards are relatively inexpensive and are tamper resistant. The tamper resistance reduces the risk of many authentication attacks such as the brute force Password attack.

Many hardware Tokens have the means to uniquely identify themselves. For some, it is a unique serial number that is bound to the Token. For others it can be a Radio Frequency ID (RFID) that is fabricated into the physical medium of the Token. This identity value can be used as another part of the binding between the individual and the data being protected.

Some hardware Tokens include one or more Biometrics and/or fuse multiple Biometric technologies to enhance the security of the data on the Token and the performance. This also helps to remove another series of attacks that can be performed when the Biometrics are external to the Token.

Password

Passwords are currently the de-facto standard for individuals to authenticate themselves. It is something that the individual knows. A Password can rely on at least one of several factors to provide heightened effectiveness. First, only that individual should know the Password. Second, the Password should not be easily determined. Third, there should be either a limited number of attempts or the Password should be computationally infeasible to determine within some pre-defined time period. The length of that time period is determined using risk assessment and risk analysis techniques.

Many cryptographic systems use the PKCS #5 Password Based Encryption (PBE) standard to help make it more difficult to attack Passwords. PKCS #5 uses a random "Salt" value to counter most dictionary-style Password attacks. It also adds a computational increment that is not too great for the legitimate User, but makes it much more difficult to perform a brute force attack on the Password.

Another factor that makes Password attacks more difficult is to increase the length of the Password or the number of values that can be used for each character in the Password. The longer a Password is made, the longer it will take to determine the Password. For each additional character added, the computational time to discover the password increases.

For this example, the valid characters are uppercase letters and numbers. Each additional character added to the Password adds a factor of 36 to the combination count. A two-character Password has $36^2$ or 1296 possible values. A three-character Password has 46,656 possible values. Just adding two more valid values to each character adds ($38^3-36^3$) or 8216 more combinations for a three-character Password. In this example, it was assumed that the attacker knew the length of the Password. If the attacker knew that the Password was between two and three characters, the combination count would go up to 47,952 ($36^2+36^3$).

The downside with long Passwords is that people tend to forget them or write them down. If they are written down, they can be compromised. If they are forgotten, the administrators tasked with the identity management must help restore functionality for the User. This adds to the Total Cost of Ownership.

Configurable Identification and Authentication

The ultimate goal would be to use the best of all the identification factors, and have it cost very little to set up and maintain. Because the cost will likely never be at the optimal level, and the different factors present significantly different costs and risks, some form of Risk Assessment and Risk Management should be used. During this assessment, key individuals can be identified as requiring a high level of identity assurance. Other individuals, however, may only need a medium level of assurance. There could even be some that need a very low level of assurance.

The Configurable Identification and Authentication system presented in this embodiment enables a tiered approach with the adjustment of the factors and their parameters to allow for multiple identity assurance models. This is advantageous by providing the measures that the Risk Assessment determines are needed, while still keeping the Total Cost of Ownership at an acceptable level.

Each of the identification factors provides different levels of protection at different costs. The Password factor, for instance, allows for a large range of minimum and maximum Password lengths. It also allows for the selection of the valid values for the Password characters, as well as the minimum number of special character types. There is, however, a cost factor to Passwords. Increasing the size of the Password, combined with frequent Password changing, can create a significant problem. Users tend to forget Passwords and may write them down. If they are written down, that person's digital identity can be compromised. The other cost factor is the amount of time and effort that the administrators must expend to fix Password problems.

An individual who requires a high identity assurance model could use a highly accurate Biometric reader, in combination with a hardware Token (preferably one that includes the Biometric reader) and a long complex Password. With this mix of identification factors, the identity assurance is high, but so is the cost.

The minimum identity assurance model may only require that the individual have a badge. The mere existence of the badge may offer enough assurance based on the risk assessment of that individual.

Many different combinations between these extremes can exist. The Configurable Identification and Authentication system allows for a mix/match system to manage cost and risk.

The result of the Configurable Identification and Authentication process is a protected linkage between the Token and the Provider. The Provider is either a piece of software on the User's computer that is responsible for accessing the Token, or a smart reader that controls access to the Token. The process also provides for the ability to have an encrypted profile that could reside on the Token.

Communications

In most combinations of the identity factors, there is the need for information to be transferred to different hardware/software modules/components. Each of these components has one or more security and trust boundaries as well as process and physical binary (for example, DLL, Shared Library, EXE, etc.) interface boundaries. Most attacks will occur at these boundaries. Because of this, the data that is transferred should be benign. That means that the information is either public information or is protected somehow. One general statement that can be made is, the fewer boundary transitions that occur in a system, the more secure that system can be.

With both of these statements in mind, it is apparent that the communication between the components should be protected whenever sensitive data is transferred. For hardware Tokens, some, if not all, authentication information should be protected in such a way that the Password and other sensitive data are not communicated directly. Also, any and all keys and keying material should likewise be protected.

Software Tokens have fewer boundaries and in general do not require the same level of communications protection between the Token and the software Token Provider (a software form of a Provider). In most software Tokens, all of the logic to access and use the Token is located within the Provider. Therefore, the boundaries between the Provider and Token are reduced in most cases to be non-existent. There are, however, different data protection issues with software Tokens. For example, the cryptographic and identity information in the Token must be stored encrypted. Otherwise, security does not exist.

Another problem that can occur in the context of security boundaries is a replay attack. In this form of attack, the attacker sits at a boundary and reads the information that is transmitted between the different pieces of the system. Then, in the hopes of producing some favorable result, the attacker at some point resends the same information.

The system proposed in this document uses a challenge/response system to avoid the problem of transmitting a Password to hardware Tokens. This system uses cryptographic hashes and a random nonce to validate that each end (the Token and the Token Provider) knows the Password. The nonce helps to eliminate the longer-term replay attack (longer than one session) because the computed values will be random for each authentication attempt. It does not, however, deal with the short-term replay attacks that can happen within one Authentication session. This will be addressed by other means.

The transmission of keys, keying material, and plaintext between the hardware Token and the software Provider also needs to be protected. In most implementations, there are many levels of software and hardware, both protected and unprotected. With these levels, there are many opportunities for an attacker. To protect from this, the data must be encrypted. One effective way to accomplish this is the use of Diffie-Hellman key agreement. Using the key agreement, the software Provider does not need persistent keying material or keys. The keys are relatively short-lived session keys.

The following sections will discuss the challenge/response and data encryption in more detail.

Challenge/Response System for Authentication

The first communication between the Provider and the hardware Token that needs protection is the authentication process. This is where the authentication factors like Password and Biometrics are combined with the Token to unlock the data and functionality of the Token.

It is important to note that for this section, it is assumed that the Token already has authentication information established. For a discussion on the establishment of the authentication information, refer to the section called "Token Setup" in "Identity Authentication Setup and Change".

Password Authentication

Figure 16:
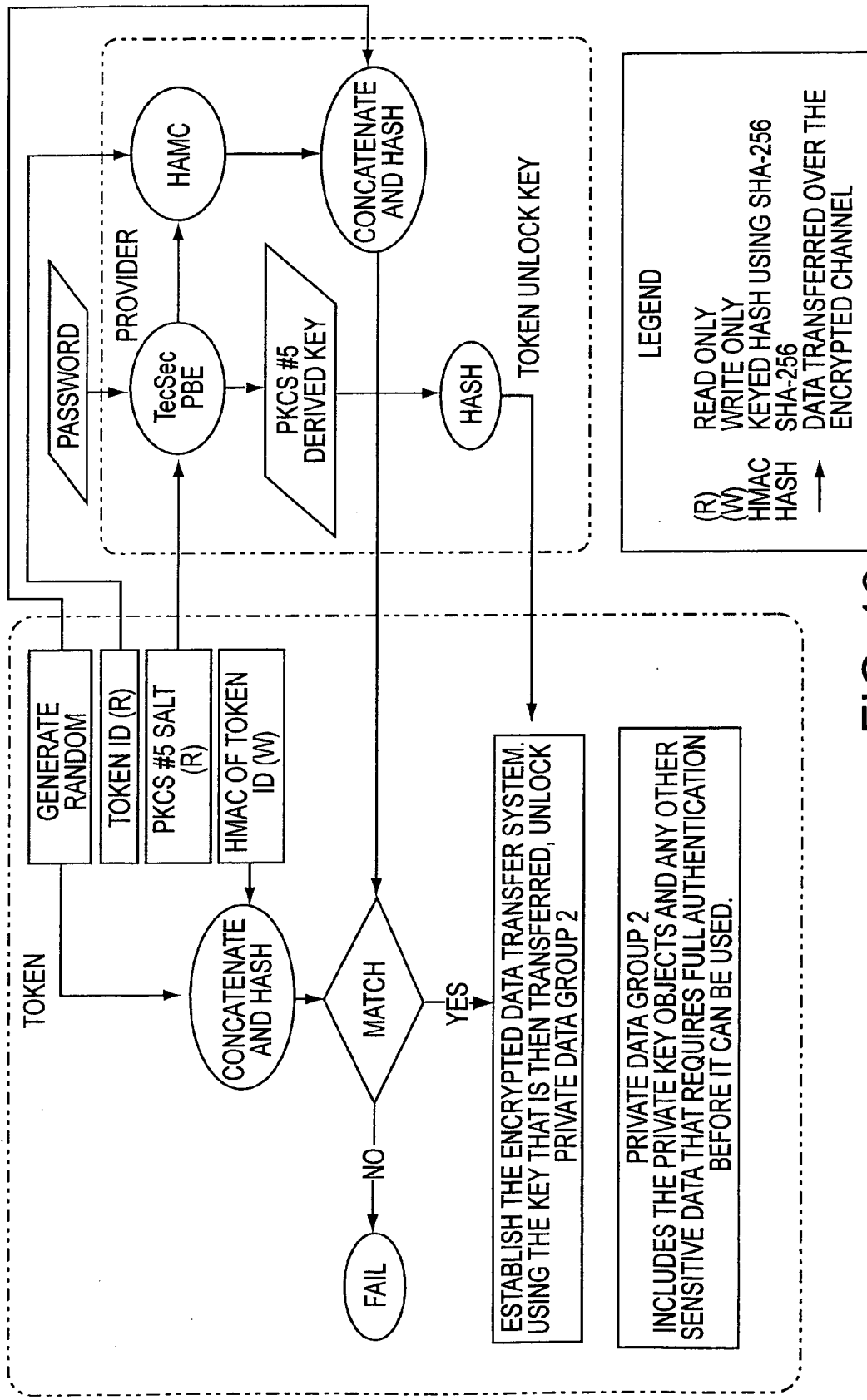
FIG. 16 is a diagram showing a simple version of the authentication process for the case where only Token and Password factors are required.

FIG. 16 illustrates a simple version of the authentication process for the case where only Token and Password factors are required.

In this example, the authentication process begins with the Provider requesting the challenge information from the Token. Alternatively, however, the token can request or notify the Provider to receive the challenge information. The challenge information in this case consists of a Token-generated random value, the Token ID, and the PKCS #5 Salt value. PBE is discussed in more detail below. For this discussion, the Token ID will be a unique serial number assigned to this Token.

At the Provider, the Salt value is combined with the Password from the User using PBE to create a hash and a PKCS #5 derived Key. The Key will be used later for the protection of Biometric templates and as part of the sensitive data handling. The PBE hash is then combined with the random number or value ("number") and sent to the Token. The Token then performs a similar computation using the stored PBE hash and the same generated random number. If they match, the hash of the PBE derived key is used to unlock the second group of private data.

The Configurable Identification and Authentication system defines two groups of private data. The first group includes data that only requires Password authentication to release. This will be illustrated in the next example. The second group of private data is only available after the full authentication process has succeeded.

In this example, it should be noted that until the Token Unlock Key is required, only public values are transferred from the Token to the Provider. Also the value to be matched that is sent from the Provider to the Token will only work for this authentication attempt. Each authentication attempt will have its own unique random value. The final stage of authentication requires that a secret value be transferred to the Token.

To facilitate this transfer, the Encrypted Data Transfer system will be used. This system is discussed in detail in the section called "Encrypted Data Transfer system."

For this particular authentication system to work, the Token should have several attributes. First, it should be able to generate a random value. Second, it should have some form of Token ID that can be retrieved from the Token before the User authenticates to the Token. This value should not be modifiable once the Token is initialized. It could be factory determined. Third, the PKCS #5 Salt value should be retrievable from the Token before the User is authenticated. This value should be computed within the Token at the time that the User Password is established. Fourth, the PBE HMAC of the User Password should be in, or otherwise stored in a manner in, memory that cannot be retrieved from the Token. This value should only be set during the Password establishment or when the Password is changed.

The PBE process also creates a PKCS #5 key that can be used for further authentication.

Password and Biometric Authentication

The addition of one or more Biometric devices adds additional complexity to the process. All of this complexity occurs after the Password authentication for Tokens generally, or ones that do not include a Biometric reader.

Figure 17B:
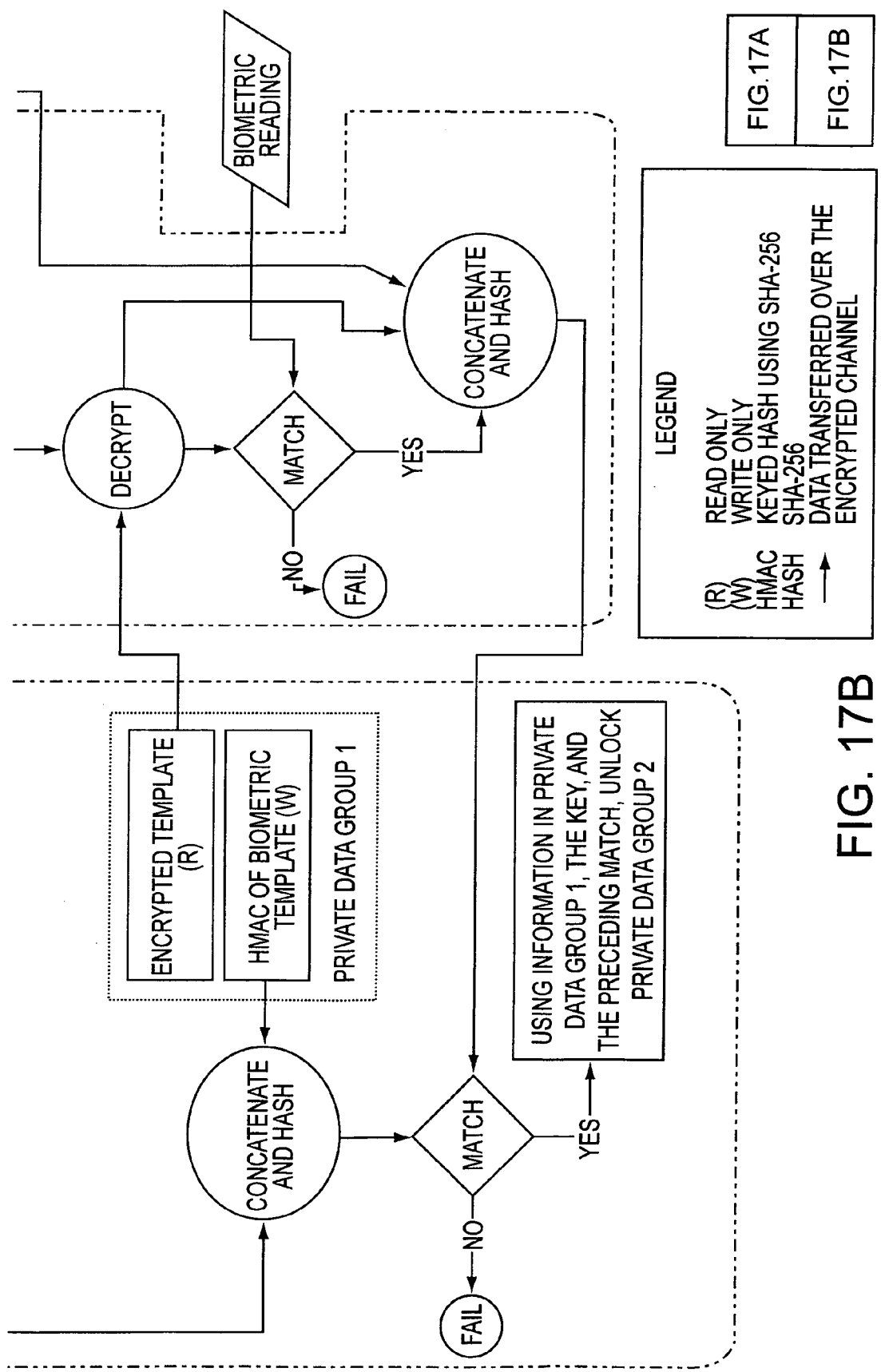
FIG. 17 is a diagram that illustrates a Token that requires external Biometric validation to become authenticated.

FIG. 17 illustrates a Token that requires external Biometric validation to become authenticated.

In this example, the Password portion of the authentication can be exactly the same as, or similar to, the Password-only authentication. After the Password authentication succeeds, the encrypted Biometric template is made available to the Provider. This template is encrypted using the PKCS #5 derived key. The Provider decrypts this value and performs a comparison between the template and the captured sample from the Biometric device. If they are verified, the hash (SHA-256) of the decrypted template and the random value are sent to the Token for validation. If verified, the private data and functions are unlocked. After one or more failures, the Token can reset to the beginning and adjust the count of consecutive failed login attempts. Thus, in this case, the Token should enforce that only a limited number of consecutive failed login attempts are allowed. If this limit is exceeded, the Token can be put into an unusable state. The most common mechanism is to lock the Token. When the Token becomes locked, it is unusable, either permanently or until it is unlocked using the approved mechanism. If the data on the Token is of an extremely high risk nature, the Token could be protected by means such as the total destruction of the extremely high risk data.

A Token can also contain the Biometric devices to gather the measurements and determine if they match a template. For these devices, the handling of the Template and the unlocking of the data can internally be dependent upon the success of a Biometric reading. The Biometric reading could take place either before or after the Password entry. These are open issues that the Token implementer can address.

Figure 18:
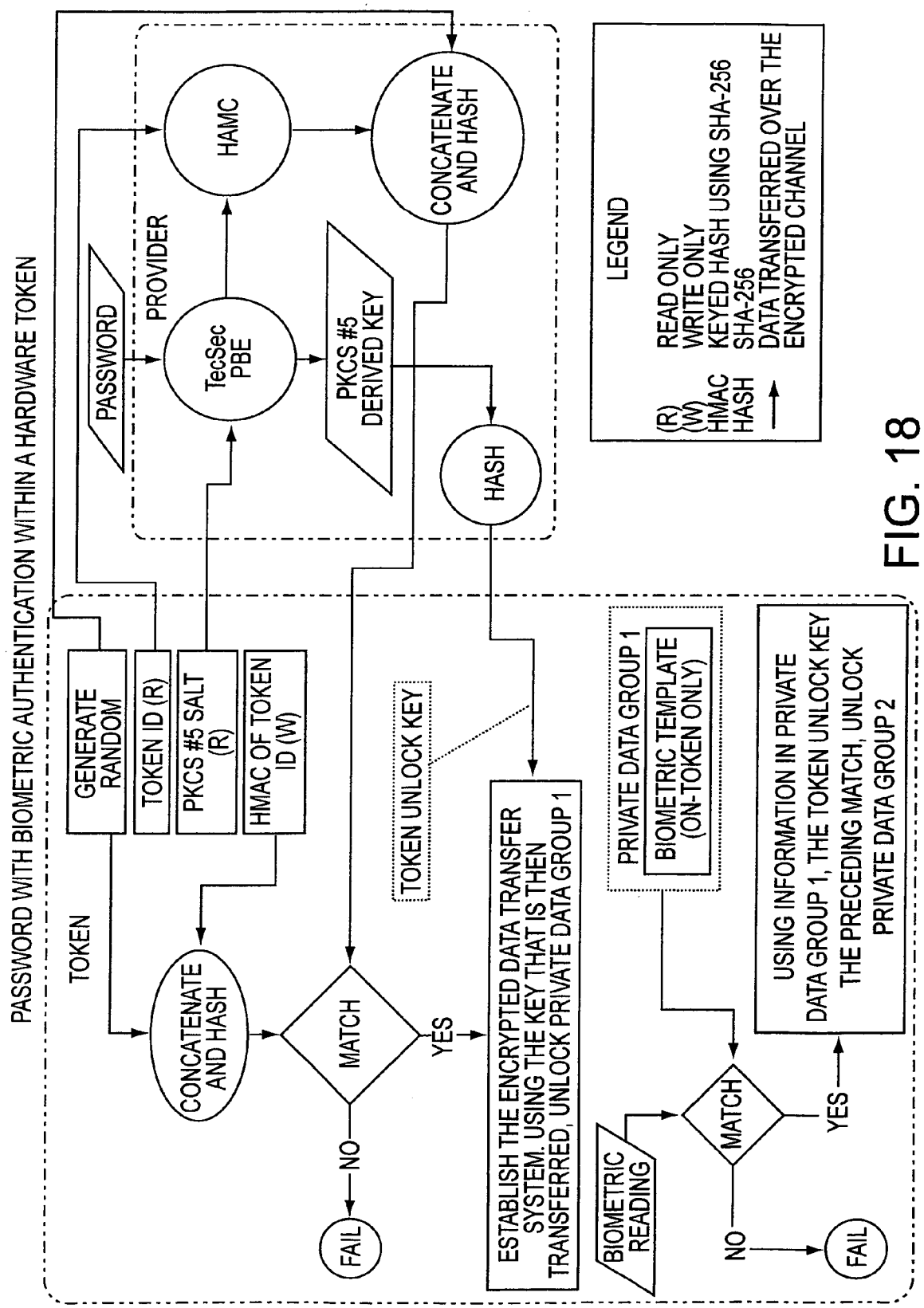
FIG. 18 is a diagram that illustrates the Biometric Authentication on the Token.

FIG. 18 illustrates the Biometric Authentication on the Token.

Encrypted Data Transfer

Now that it is possible for the User to authenticate with the Token, the private key material and functions become available. The next step is to protect the transfer of the private and/or plaintext data between the Token and the Provider.

Please note that for this section, it is assumed that the Token already has authentication information established. For a discussion on the establishment of the authentication information, refer to the section called "Token Setup" in "Identity Authentication Setup and Change".

The Token contains and has access to all of the private keying material placed on it. The Provider has access to the derivative components of the Password and the session random number. The Token only has the HMAC derivation of the Password and the session random number. These items may not be sufficient by themselves to protect the data transfers from attack. Therefore, other systems can be used to bolster the protection.

There are three classes of attack that should be prevented:

1) Sniffing, where a passive attacker monitors all communications between the parties and attempts to obtain information from the data.

2) Man in the Middle, where the attacker intercepts the communication from either or both parties and can change messages, block messages or add messages.

3) Replay, where a passive or active attacker monitors the data being transferred and attempts to cause an action to occur by resending a known good message. The attacker may not know what the message does.

Sniffing

Sniffing is the easiest attack to block. All sensitive data can be encrypted so that the attacker cannot gain any information. To do this, a common session key can be established between the Token and the Provider. The Token can contain a Diffie-Hellman parameter set, which can already be established using Management software, such as a Key Manager (for example, CKM Enterprise Builder (EB)), for the Enterprise in which the member is enrolled, or alternatively, established at any prior point. This parameter set can be transferred to the Provider as is, since it is effectively all public information and is therefore benign. However, this set can also be encrypted if desired. Both the Token and the Provider can use this parameter set and compute a key pair. The Token can send its computed public key to the Provider, and the Provider can send its computed public key to the Token. At this point in time, both the Provider and the Token can compute the same session key based on Diffie-Hellman key agreement.

Any data that is sensitive or private can now be transmitted securely between the Token and the Provider using encryption and this session key. The sniffer is therefore blocked. We still need to address the man in the middle and replay attacks.

Man in the Middle

In the man in the middle attack, the attacker sits somewhere between the Token and Provider. He can monitor the communications and identify when the parameter set is sent to the Provider. He can also intercept the key exchange. At this point in time, he has enough information to compute his own key set and exchange his key with both the Token and Provider (The man in the middle poses as the Token to the Provider and the Provider to the Token.) Then, the Token, Provider, and attacker all have the same "shared value key."

There are different effective ways to block this attack. One way is to encrypt the data using an already shared secret. Another way is to use a keyed hash and effectively sign the data. Both of these methods require a shared secret. Because of the Configurable Identification and Authentication specifying a challenge/response system, both the Token and the Provider have a shared secret that the man in the middle does not have. This value is the HMAC of the Token ID. For example, an HMAC and a SHA-256 hash can be used.

For example, each message that must be protected can have the HMAC appended thereto. The HMAC can be computed from the message and the random challenge concatenated together. The key is the HMAC of the Token ID. By adding the random component, the HMAC is different for each message in each session. This provides effective blocking of a man in the middle attack, and also blocks cross session replay attacks (where the data is recorded in one session and replayed in another session) because each session has its own random value.

Replay

The next attack is the replay attack. There are two forms of this attack. The replay could be a replay of messages from this session or from a different session. Using the HMAC from the man in the middle attack solution, we have effective protection from the replay from another session attack because each session has its own random value. Therefore, there may only be the replay attack from the same session to block. The most effective method of defeating this attack is the addition of message numbers or values (collectively, "numbers"). Each message sent from the Provider would have an auto-incrementing or -sequencing number appended to, or otherwise included with, the message. This number would be included in the HMAC. The recipient would then check this message number to make sure that the following conditions are met:

The message number is larger than the last received message number; resetting the message number for each session will minimize message number handling.

The communications from the Token to the Provider would also have the same handling, but would have a different message number.

Using this message number system (in combination with the HMAC solution), the message numbers can all start at 1 for each session. This is justified because of the challenge random being in the HMAC. This value gives a significant separation between sessions.

At implementation, a threshold can be established regarding accepted message number comparisons. The ideal would be to maintain a consistent message number count.

The recommended HMAC is the SHA-256; SHA-384 and SHA-512 are optional.

Figure 19:
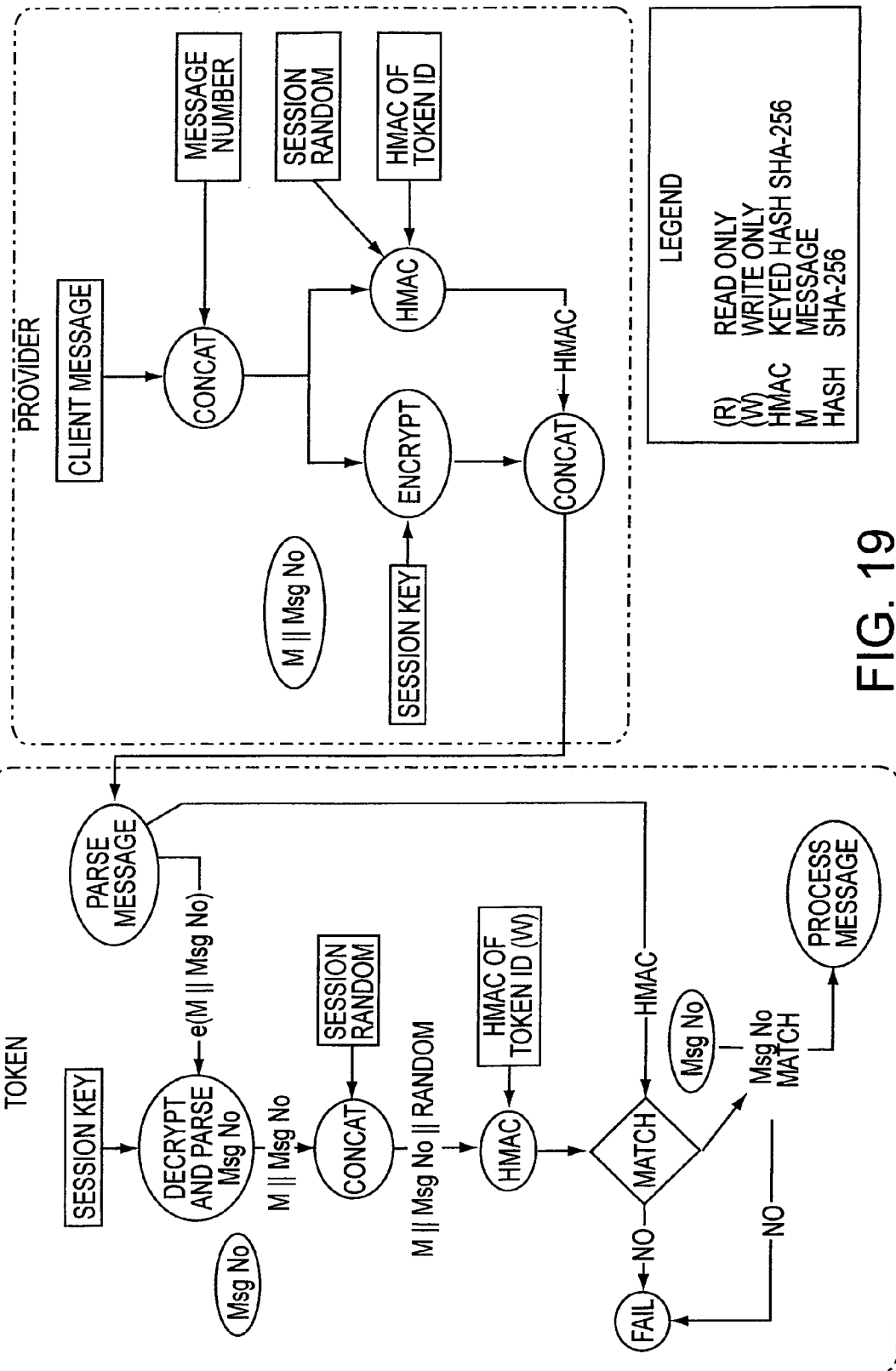
FIG. 19 is a diagram that illustrates the transmission and checking of a message from the Provider to the Token.

FIG. 19 illustrates the transmission and checking of a message from the Provider to the Token.

The process is the same for a message sent from the Token to the Provider. The only difference is that the Token message numbers are used instead of the Provider message numbers.

Figure 20:
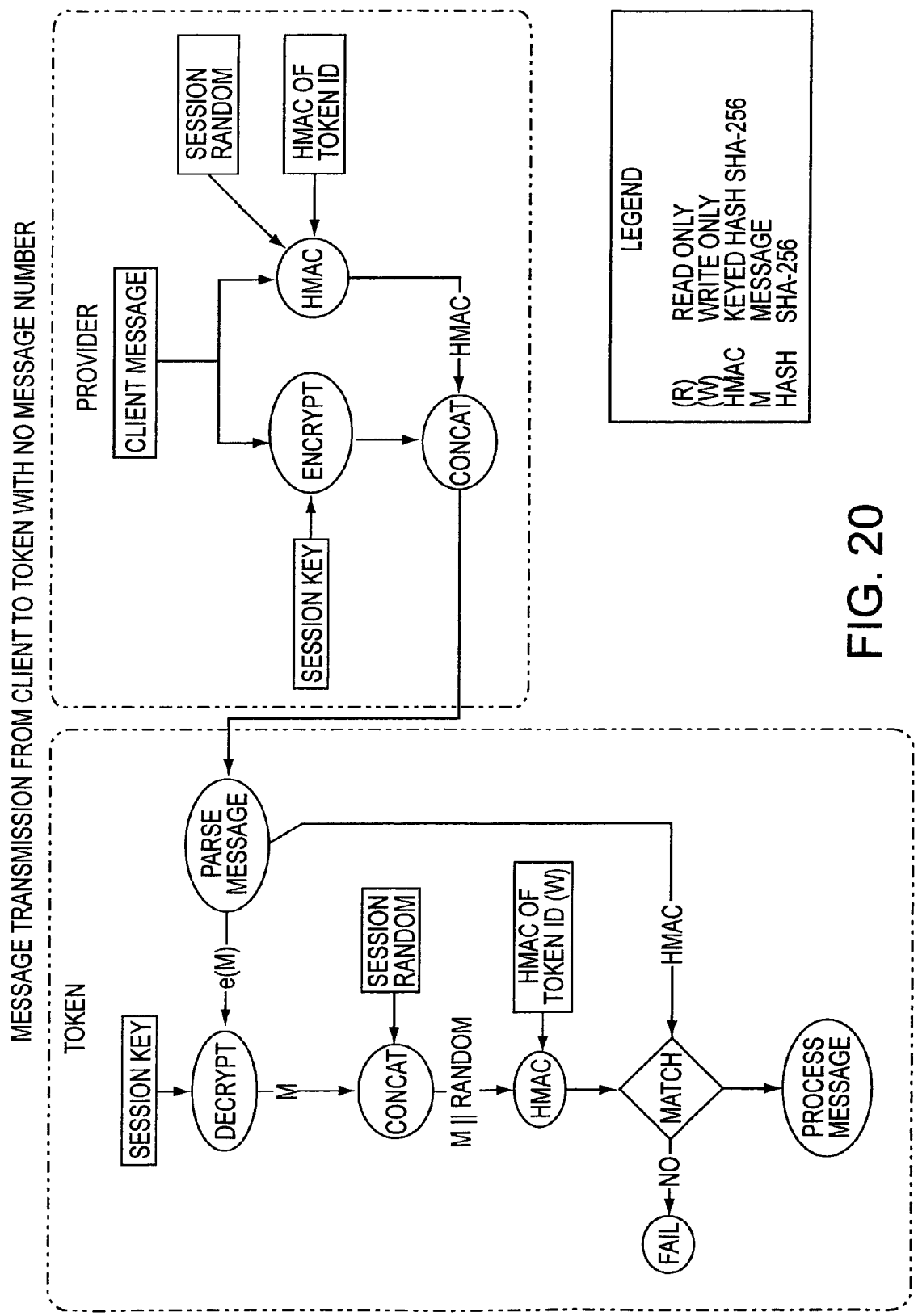
FIG. 20 is a diagram that illustrates the transmission and checking of a message from the Provider to the Token, if the message number system is not required.

If the message number system were not required, then FIG. 20 would apply.

It should be noted that this entire discussion assumes that the Token is internally protecting all private data from exposure through any means but the secure channel. If the data could be accessed external to the Token through any other means, then the private data would have to be encrypted before it is placed on the Token. The key for this encryption would itself be encrypted using the PKCS #5 key from the Password. This encrypted key would be stored on the Token as private data that would only be available after a successful authentication. The Provider would then have to decrypt this key so that it could decrypt the private data from the Token.

Further, if it is too expensive for the Token to implement the Message protected channel, then the system using the key encrypted by the Password based key (in note 1) could be used. In this way, the Token does not have to process the encryption or decryption. This is, however, a weaker system because the replay and man in the middle attacks are still possible.

In addition, it should be noted that the above Replay solution is not limited to numbers. For example, values from an ordered set may be used instead of numbers, such as S={0, 4, 5, 1, 9, 2, 4}. Further, iterative bit-wise or mathematical functions may be used instead, to the extent they reliably provide particular numbers or values.

Identity Authentication Setup and Change

Three times during which the authentication information can be at risk are: a) during the initial Token setup, b) whenever the Password is changed, and c) whenever the Biometric template is changed. During initial setup, the Token can be, for example, connected to the administration computer (defined as the computer that is running the CKM Enterprise Builder Provider software or other Management software).

To facilitate the security integrity of the CKM Enterprise Builder Provider or other Management software, the establishment of the authentication information can require the Encrypted Data Transfer system. This includes the establishment of the Security Officer (SO) PIN. Otherwise one or more of the authentication parameters could be compromised. The SO PIN is used to establish the first User PIN, and is also used to limit the initialization of the Token and the unlocking of the User PIN.

Token Setup

The SO PIN is established at Token initialization. At this point in time, there is no key material on the Token.

The Token generates a Public Key pair (i.e. RSA) that can be used only for the initial setup of the Token. This key pair can be generated on the Token. The private key should never leave the Token (without first being secured). The Provider would request the public key from the Token. Then the Provider builds the following items:

1) PKCS #5 Salt for the SO PIN (randomly generated)
2) HMAC of the Token ID for the SO PIN.

These items are encrypted using the Token public key and then sent to the Token. At this point, the Token is usable in a limited form. The key pair should then be deleted from the Token. It is no longer needed. In an exemplary embodiment, it can only be used for the first time setup of the Token and should be generated at that time.

The initialization process could have used Diffie-Hellman, but there would be no protection from the man in the middle attack. The protection mechanism previously selected and that was used to block the man in the middle attack requires that both ends have a shared secret value. During Token initialization and setup, there are no shared secrets. Therefore, the message HMAC cannot be performed and by extension, Diffie-Hellman would not be effective for the Token initialization.

Once the SO PIN is established, it is possible to establish the Encrypted Data Transfer system and therefore allow the User PIN information to be established. The Provider will need to generate the following items and send them to the Token using the Encrypted Data Transfer system:

1) PKCS #5 Salt for the User PIN (randomly generated)
2) HMAC of the Token ID for the User PIN.
3) The Biometric template (if any) encrypted using the key derived from the User PIN.

After the SO and User PINs are established, the Token is ready for use. Also, since the data transferred to the Token was benign, the man in the middle attack is blocked.

The replay attack is not particularly worrisome for Token setup, since the Token can only be set up once.

Identity Authentication Change

Once the Token has been initialized and the original authentication information established securely within the Token, it is possible to securely change the authentication information. To facilitate this, the following should be true:

1) All authentication information must be sent to the Token using the Encrypted Data Transfer system, or in an otherwise secure manner.

2) The prior authentication information (including the initial Token setup) has not been compromised.

If the immediately prior authentication information (i.e. Password) was compromised and there was a man in the middle attacker in the current session with the old Password, then this current communication session is also compromised. This means that once a Token Password is compromised, that Token should be considered to be perpetually compromised unless the authentication information can be changed on a computer that is known to not have a man in the middle attacker. This can add to the Total Cost of Ownership. It is not easy to keep even one computer free from an attacker. Even though the RSA channel that was used for the initial setup of the SO PIN is available, it cannot be used after the initial setup. This would allow an attacker to push his or her own authentication information into the Token and thereby assume the identity of the true Token owner.

All authentication information should be sent to the Token using the Encrypted Data Transfer system (or in an otherwise secure manner). This requires that the User already be authenticated to the Token. There is a problem with this approach. For convenience, Users do not like to authenticate for each operation. Because of this, the authenticated connection to the Token tends to stay open for extended periods of time.

This allows another form of attack. In this attack, the authenticated instance of the Provider is used to change the Password—but not by the authenticated User. There are at least two different ways that this could happen.

First, the User may have left his computer logged in and active, and stepped out for a minute. In this case, the attacker just has to go to the computer and change the Password.

Second, the Provider software that is using the authenticated Provider could have been compromised. In this way, the compromising software could easily change the Password. For Tokens that implement the Biometric internally, this level of compromise does not exist.

If the Password needs to be updated, below is an exemplary sequence that will provide a level of protection. The Token should require that the challenge/response be successfully met with the old Password within the time that the new Password is being established. Here are the steps:

1) Provider computes the new authentication information using the new Password (PIN).

2) Provider tells the Token that new authentication information is being sent.

3) Token tells the Provider that it is challenging the old PIN and sends a new random number to the Provider.

4) The Provider retrieves the old PIN from the User.

5) The Provider computes the response from the new random number and the PIN from the User.

6) The Provider sends this response to the Token.

7) The Token responds back with success, or fails the operation.

Please note that all of the above communications are transmitted using the Encrypted Data Transfer system, or some other secure manner.

The following items can be computed using the new Password and sent to the Token:

1) PKCS #5 Salt (should be changed from the old one.)

2) HMAC of the Token ID.

3) The Biometric template (if any) must be decrypted using the old key and re-encrypted using the new key.

These are the same items that must be computed for the initial Token setup. Please note that only the SO can change the SO PIN and only the User can change the User PIN.

Sensitive Data Handling

Not all Tokens can process the sensitive data internally. Some may have to defer to Management software and/or hardware, such as the Provider, for some functionality. An example of this is the support for a Key Management system, such as that described in U.S. patent application Ser. No. 09/023,672. The ideal solution is that the Management software and/or hardware, Provider or Key Management system is integrated into the Token. For all other cases, sensitive data must be extractable from the Token so that the Provider can process it. This is potentially a security problem even with the Encrypted Data Transfer system.

The primary problem with extractable sensitive data is that the data could become compromised. If this happens, then any data encrypted with the sensitive material would also be compromised. With the Tokens that do not allow for the exporting of the sensitive data, compromise is nearly impossible. To help reduce the risk of compromise with Tokens that do allow such exportation, the sensitive data could be pre-encrypted, such as with a symmetric key (referred to as EK or encryption key). An EK itself can be a random value. This key, however, should be protected since it must be extractable from the Token.

Figure 21:
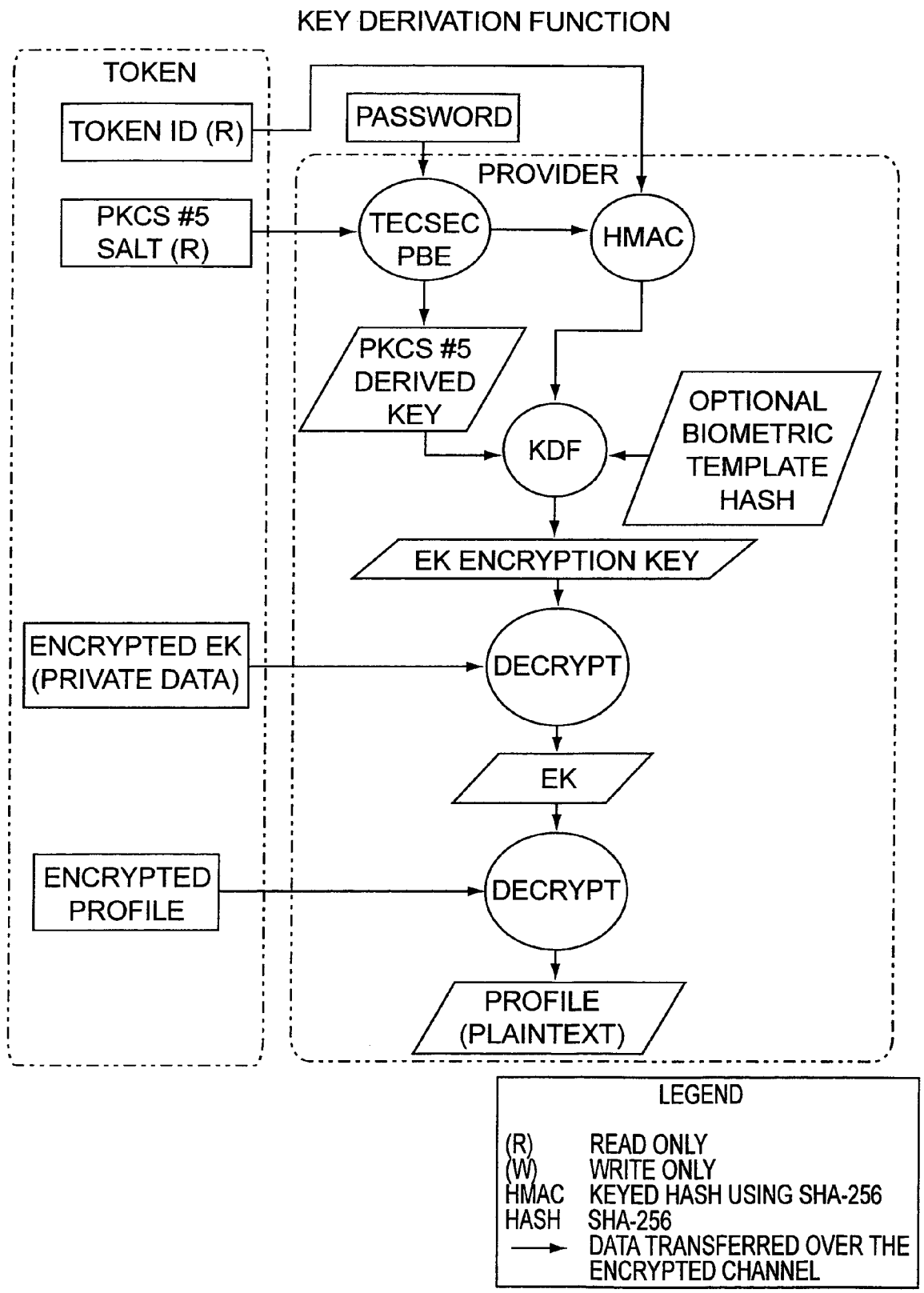
FIG. 21 is a diagram of a key derivation function according to the present invention.

One way to protect the EK is to encrypt it using a derivative of the authentication information. The Configurable Identification and Authentication system can use the following process to create the key used to encrypt the symmetric key. See FIG. 21.

This key could be encrypted using the PKCS #5 PBE generated key from the User Password. This encrypted key can then be stored on the Token in the private data objects. Only the Provider, using the User Password, can decrypt the encryption key. In this way, if the sensitive data is extracted from the Token through other means, it is still protected.

The KDF is described in ANSI X9.42 section 7.7.2—Key Derivation Function Based on Concatenation. A brief synopsis is presented below.

Any or all of the private data could be encrypted in this way. This includes anything from the entire set of private data down to a single field of a single private data object. For this example, the generic term of Profile is used to describe the private data that was protected. For the encrypted data to be usable, it must be transferred to the Provider and decrypted. This implies that objects should be separately encrypted so that the entire private object group does not have to be transferred. However, objects could be encrypted together.

Summary

The Configurable Identification and Authentication system as set forth in this embodiment allows for a number of different configurations and levels of protection. This allows for a wide range of risk/cost scenarios. It also includes the means to protect data at rest on the Token, as well as the protection of the authentication process itself.

The data at rest protection is further split into two parts, data that can be used by the Token and sensitive data that is exportable from the Token. All of these different elements can use different keys, or derivations of keys, to reduce the exposure of the keys.

The intent is to identify and authenticate a User through different risk or assurance levels that will result in only that User having access.

In summary, this Configurable Multi-factor User Identification and Authentication system is extremely flexible. The selection of a specific configuration of I&A elements for each User can occur commensurate with the level of risk assumed and the level of protection required for that user.

PBE

Particular embodiments of the Configurable Identification and Authentication Scheme (fourth embodiment) use an extended PKCS #5 Password Based Encryption (PBE) to derive an encryption key from a User Password. The extension is the use of SHA-256 instead of SHA-1. The PBE technique is discussed in a simple form. For more detail, refer to the "PKCS #5 v2.0: Password-Based Cryptography Standard" document from RSA Laboratories.

End Users tend to use Passwords that are simple to remember. Because of this, most Passwords do not have a lot of randomness to them. To help reduce the problems that this causes, PBE uses a Salt value, which is a random value (1 or more bits) that is used as an index into a larger set of Passwords. A Salt of 8 bytes (64 bits) or more is preferably used for the Configurable Identification and Authentication system. This gives at least $2^{64}$ different possible resulting keys from the same Password. Each Password can also have its own Salt value.

PBE uses an approach to Password-based cryptography whereby the computation of a key from a Password is relatively expensive. In this way it is difficult for an attacker to generate the possible Passwords in a reasonable timeframe. PBE iterates through the key generation algorithm multiple times. The standard suggests about 1000 iterations. This count does not place too large of a burden on the valid User, but it does create a large burden on the attacker due to the need for the attacker to run the algorithm numerous times.

Figure 22:
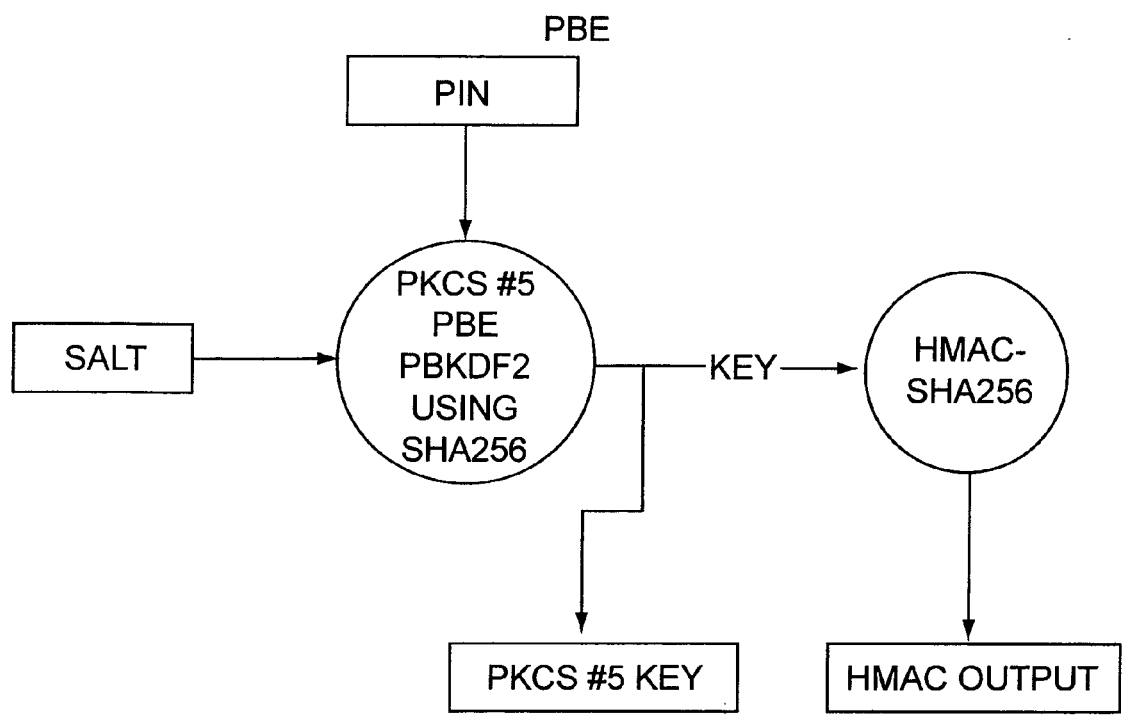
FIG. 22 is a diagram illustrating a password based encryption scheme according to an embodiment of the present invention.

The Configurable Identification and Authentication system uses the PBE in combination with a HMAC-SHA256 routine to validate the User and SO PINs. FIG. 22 illustrates how these components work together.

The Configurable Identification and Authentication system preferably uses version 2 of the Password Based Key Definition Function (PBKDF2) to generate the key. This specification requires a pseudorandom function as the basis for the iterative engine to generate the key. HMAC-SHA256 should be used for this function.

This key is returned for use as key material, and is the key for an HMAC of the PIN. The Configurable Identification and Authentication system uses both the key and the HMAC for different parts of the authentication process.

The Key Derivation Function

An example of the Key Derivation Function used is described in ANSI X9.42 in section 7.7.2—Key Derivation Function Based on Concatenation, which is incorporated herein by this reference. The algorithm as described uses a computed shared value between two parties. Here, the value of the concatenated Biometrics template, Password and Token ID is used in place of the shared value. The SHA-256 hash (see FIPS 180-2) will be used as the hash function. Let P represent the Token ID, K the PKCS#5 Password derived key, and B the value of the decrypted privacy block of the ANSI X9.84 privacy object (or integrity and privacy object) stored on the Token. We have for the input items 1, 2 and 3 respectively: ZZ is (P∥K∥B), keylen is 128. Hence, the value of d in the algorithm will be 1, resulting in only one iteration of step 3 in the actions portion of the description. Essentially, the key value results from hashing (P∥K∥B∥0x33 00000001) and takes as the EK encryption key the leftmost 128 bits.

INDUSTRIAL APPLICABILITY

The present invention provides a set of multi-factor configurable identity assurance models that reduces system vulnerability to risk, including due to data interception and data replay attacks between the different software layers and the physical hardware.

The invention claimed is:

1. In a computer system comprising a token communicatively connected to a provider, a method of authenticating a user to use a system, comprising:
generating, by the token, a random value;
sending, by the token, the random value, a token ID, and a salt value to the provider;
providing, by the user, a user password to the provider;
generating, by the provider, a derived key based at least in part on the salt value and the password;
applying, by the provider, a first key-based hash algorithm, using the derived key, to the token ID to provide a first hash value;
generating, by the provider, a first challenge data instance based at least in part on the random value and the first hash value;
sending, by the provider, the first challenge data instance to the token;
generating, by the provider, a token unlock key based at least in part on the derived key;
sending, by the provider, the token unlock key to the token;
generating, by the token, a second challenge data instance based at least in part on the random value and a second hash value, wherein the second hash value is stored on the token and is based on the token ID;
determining, by the token, whether the first and second challenge data instances match;
terminating, by the token, the method, if the first and second challenge data instances are determined not to match; and
if the first and second challenge data instances are determined to match, then establishing an encrypted data transfer system between the token and the provider,
unlocking with the token unlock key, by the token, locked first private data stored on the token, and
authenticating the user for secured use of the system based at least in part on the unlocked first private data.

2. The method of claim 1, wherein the derived key is generated with a password-based encryption algorithm.

3. The method of claim 2, wherein the password-based encryption algorithm is based at least in part on PKCS #5.

4. The method of claim 1, wherein the first hash algorithm is a hash function-based message authentication code.

5. The method of claim 1, wherein generating the token unlock key includes hashing the derived key to provide the token unlock key.

6. The method of claim 1, wherein generating the first challenge data instance includes mathematically binding together the first hash value and the random value to provide the first challenge data instance.

7. The method of claim 1, wherein
generating the first challenge data instance comprises mathematically binding together the first hash value and the random value to provide the first challenge data instance; and
generating the second challenge data instance comprises mathematically binding together the second hash value and the random value to provide the second challenge data instance.

8. The method of claim 1, wherein
generating the first challenge data instance comprises mathematically binding together the first hash value and the random value to provide a first resulting value, and hashing the first resulting value to provide the first challenge data instance; and generating the second challenge data instance comprises mathematically binding together the second hash value and the random value to provide a second resulting value, and hashing the second resulting value to provide the second challenge data instance.

9. The method of claim 1, wherein establishing the encrypted data transfer system comprises generating, by at least one of the token and the provider, a shared key.

10. The method of claim 9, wherein the shared key is a shared session key.

11. The method of claim 9, wherein the shared key is generated based at least in part on shared data that includes a Diffie-Hellman parameter set.

12. The method of claim 1, further comprising:
combining, by the provider, a message and a present message value to provide a modified message;
encrypting, by the provider, the modified message, using a shared key, to provide an encrypted message;
combining, by the provider, the modified message and the random value to provide a first pre-hash value;
applying, by the provider, the first key-based hash algorithm, using the first hash value, to the first pre-hash value to provide a third hash value;
combining, by the provider, the encrypted message and the third hash value to provide a signed message;
sending, by the provider, the signed message to the token;
extracting, by the token, the encrypted message and the third hash value from the signed message received from the provider;
decrypting, by the token, the encrypted message, using the shared key to provide the modified message;
extracting, by the token, the message and the present message value from the decrypted encrypted message;
combining, by the token, the message, the present message value, and the random value to provide a second pre-hash value;
applying, by the token, the first key-based hash algorithm, using the second hash value, to the second pre-hash value to provide a signing hash value; and
validating, by the token, the message, if the signing hash value and the third hash value match and the present message value is greater than a prior message value stored on the token.

13. The method of claim 1, further comprising
combining, by the token, a message and a present message value to provide a modified message;
encrypting, by the token, the modified message, using a shared key, to provide an encrypted message;
combining, by the token, the modified message and the random value to provide a first pre-hash value;
applying, by the token, the first key-based hash algorithm, using the second hash value, to the first pre-hash value to provide a third hash value;
combining, by the token, the encrypted message and the third hash value to provide a signed message;
sending, by the token, the signed message to the provider;
extracting, by the provider, the encrypted message and the third hash value from the signed message received from the token;
decrypting, by the provider, the encrypted message, using the shared key to provide the modified message;
extracting, by the provider, the message and the present message value from the decrypted encrypted message;
combining, by the provider, the message, the present message value, and the random value to provide a second pre-hash value;
applying, by the provider, the first key-based hash algorithm, using the first hash value, to the second pre-hash value to provide a signing hash value; and
validating, by the provider, the message, if the signing hash value and the third hash value match and the present message value is greater than a prior message value stored on the provider.

14. The method of claim 1, wherein unlocking the locked first private data comprises decrypting the locked first private data with the token unlock key.

15. The method of claim 1,
wherein the unlocked first private data includes at least one user credential associated with the user; and
wherein authenticating the user includes providing at least one of the at least one user credential to the system to grant the user cryptographic reading authority.

16. The method of claim 1,
wherein the unlocked private data includes at least one user credential associated with the user, and
wherein authenticating the user includes providing at least one of the at least one user credential to the system to grant the user cryptographic writing authority.

17. The method of claim 1, wherein the system further comprises a biometric reader communicatively connected to the provider, the locked first private data includes an encrypted biometric template, and the method further comprises:
sending, by the token, the encrypted biometric template to the provider;
decrypting, by the provider, the encrypted biometric template with the derived key;
providing, by the user, a biometric sample via the biometric reader to the provider;
determining, by the token, whether the biometric sample corresponds to the decrypted biometric template;
terminating the method, by the provider, if the biometric sample is determined not to correspond to the decrypted biometric template;
if the biometric sample is determined to correspond to the decrypted biometric template,
applying, by the provider, one of the first key-based algorithm and a second key-based algorithm, using the derived key, to the decrypted biometric template to provide a third hash value,
generating, by the provider, a third challenge data instance based at least in part on the third hash value and the random value, and
sending, by the provider, the third challenge data instance to the token;
generating, by the token, a fourth challenge data instance based at least in part on the random value and a fourth hash value, wherein the fourth hash value is stored on the token and is based on the biometric template;
determining, by the token, whether the third and fourth challenge data instances match;
terminating, by the token, the method if the third and fourth challenge data instances are determined not to match; and
if the third and fourth challenge data instances are determined to match, unlocking with at least a portion of the unlocked first private data, by the token, locked second private data stored on the token;
wherein authenticating the user for secured use of the system further requires that the third and fourth data instances are determined to match.

18. The method of claim 1, wherein the system further comprises a biometric reader communicatively connected to the token, the locked first private data includes an encrypted biometric template, and the method further comprises:

providing, by the user, a biometric sample via the biometric reader to the token;

decrypting, by the token, the encrypted biometric template with the derived key;

determining, by the token, whether the biometric sample corresponds to the decrypted biometric template;

terminating the method, by the token, if the biometric sample is determined not to correspond to the decrypted biometric template; and if the biometric sample is determined to correspond to the decrypted biometric template, unlocking, by the token, with at least a portion of the unlocked first private data, locked second private data stored on the token;

wherein authenticating the user for secured use of the system further requires that the biometric sample is determined to correspond to the decrypted biometric template.

19. The method of claim 18, wherein the biometric reader is integral with the token.

20. The method of claim 1, wherein establishing the encrypted data transfer system comprises encrypting messages exchanged between the token and the provider with an encryption key.

21. The method of claim 20, further comprising:

sending, by the token, an encrypted instance of the encryption key and an encrypted user profile associated with the user to the provider;

applying, by the provider, a key derivation function to the derived key and the first hash value to provide a cryptographic key;

decrypting, by the provider, the encrypted instance of the encryption key;

decrypting, by the provider, the encrypted profile with the encryption key; and providing, by the provider, the decrypted user credential to the system to grant the user at least one of cryptographic reading authority and cryptographic writing authority.

22. In a computer system comprising a token communicatively connected to a provider, a method of authenticating a user to use a system, comprising:

sending, by the token, a token ID, a salt value, an encrypted instance of an encryption key, and an encrypted user profile to the provider;

providing, by the user, a user password to the provider;

generating, by the provider, a derived key based at least in part on the salt value and the password;

applying, by the provider, a first key-based hash algorithm, using the derived key, to the token ID to provide a first hash value;

applying, by the provider, a key derivation function to the derived key and the first hash value to provide a cryptographic key;

decrypting, by the provider, the encrypted instance of the encryption key, to provide a decrypted encryption key;

decrypting, by the provider, the encrypted user profile with the decrypted encryption key, to provide a decrypted user credential; and providing, by the provider, the decrypted user credential to the system to grant the user at least one of cryptographic reading authority and cryptographic writing authority.

* * * * *